(12) United States Patent
Martinez et al.

(10) Patent No.: US 12,459,377 B2
(45) Date of Patent: Nov. 4, 2025

(54) ENERGY UNIT CELLS FOR PRIMARY VEHICLE STRUCTURE

(71) Applicant: DIVERGENT TECHNOLOGIES, INC., Los Angeles, CA (US)

(72) Inventors: Antonio Bernerd Martinez, El Segundo, CA (US); John Russell Bucknell, El Segundo, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 960 days.

(21) Appl. No.: 17/578,367

(22) Filed: Jan. 18, 2022

(65) Prior Publication Data

US 2022/0227240 A1    Jul. 21, 2022

Related U.S. Application Data

(60) Provisional application No. 63/139,293, filed on Jan. 19, 2021.

(51) Int. Cl.
| | |
|---|---|
| B60L 50/60 | (2019.01) |
| B33Y 50/00 | (2015.01) |
| B33Y 80/00 | (2015.01) |
| B60K 15/03 | (2006.01) |
| H01M 50/209 | (2021.01) |
| B33Y 10/00 | (2015.01) |

(52) U.S. Cl.
CPC ............... *B60L 50/66* (2019.02); *B33Y 50/00* (2014.12); *B33Y 80/00* (2014.12); *B60K 15/03* (2013.01); *H01M 50/209* (2021.01); *B33Y 10/00* (2014.12); *H01M 2220/20* (2013.01)

(58) Field of Classification Search
CPC .... H01M 2220/20; B33Y 10/00; B33Y 30/00; B33Y 50/00; B33Y 80/00
See application file for complete search history.

(56) References Cited

U.S. PATENT DOCUMENTS

| | | |
|---|---|---|
| 5,203,226 A | 4/1993 | Hongou et al. |
| 5,742,385 A | 4/1998 | Champa |
| 5,990,444 A | 11/1999 | Costin |
| 6,010,155 A | 1/2000 | Rinehart |
| 6,096,249 A | 8/2000 | Yamaguchi |

(Continued)

FOREIGN PATENT DOCUMENTS

| | | |
|---|---|---|
| GB | 2568868 B | 2/2021 |
| WO | 1996036455 A1 | 11/1996 |

(Continued)

OTHER PUBLICATIONS

US 9,202,136 B2, 12/2015, Schmidt et al. (withdrawn)

(Continued)

*Primary Examiner* — Christopher P Domone
(74) *Attorney, Agent, or Firm* — ArentFox Schiff LLP

(57) ABSTRACT

Methods and apparatuses for energy unit cells for primary structures are described. The method comprises obtaining enclosure criteria of an enclosure space, wherein the enclosure space is configured to contain an energy storage device. The method further comprises obtaining a load case of a primary structure of a vehicle. The method further comprises determining a primary structure design based on the enclosure criteria and the load case, where the primary structure design incorporates the enclosure space.

21 Claims, 18 Drawing Sheets

(56) References Cited

U.S. PATENT DOCUMENTS

| | | |
|---|---|---|
| 6,140,602 A | 10/2000 | Costin |
| 6,250,533 B1 | 6/2001 | Otterbein et al. |
| 6,252,196 B1 | 6/2001 | Costin et al. |
| 6,318,642 B1 | 11/2001 | Goenka et al. |
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,156,342 B2 | 10/2015 | Annaberger et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |

(56) References Cited

U.S. PATENT DOCUMENTS

| | | |
|---|---|---|
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |

(56) References Cited

U.S. PATENT DOCUMENTS

| | | |
|---|---|---|
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2006/0108783 A1 | 5/2006 | Ni et al. |
| 2010/0133030 A1 | 6/2010 | Johnson et al. |
| 2011/0042916 A1 | 2/2011 | Ananthakrishna |
| 2013/0329372 A1 | 12/2013 | Wilkins |
| 2014/0214370 A1 | 7/2014 | Olhofer et al. |
| 2014/0277669 A1 | 9/2014 | Nardi et al. |
| 2017/0057558 A1 | 3/2017 | Hillebrecht et al. |
| 2017/0113344 A1 | 4/2017 | Schönberg |
| 2017/0341309 A1 | 11/2017 | Piepenbrock et al. |
| 2017/0343984 A1* | 11/2017 | Czinger ............... B33Y 50/00 |
| 2019/0030605 A1 | 1/2019 | TenHouten et al. |
| 2019/0030751 A1 | 1/2019 | Czinger et al. |
| 2019/0105992 A1* | 4/2019 | Bucknell ............... H10F 77/45 |
| 2019/0391563 A1* | 12/2019 | Macey ............... B33Y 30/00 |

FOREIGN PATENT DOCUMENTS

| | | |
|---|---|---|
| WO | 1996036525 A1 | 11/1996 |
| WO | 1996038260 A1 | 12/1996 |
| WO | 2001089916 A1 | 11/2001 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2012104592 A1 | 8/2012 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
International Search Report and the Written Opinion issued for corresponding International Application No. PCT/US22/13003, Apr. 1, 2022.
Extended European Search Report received for European Patent Application No. 22743118.6, mailed on Dec. 13, 2024, 8 pages.

* cited by examiner

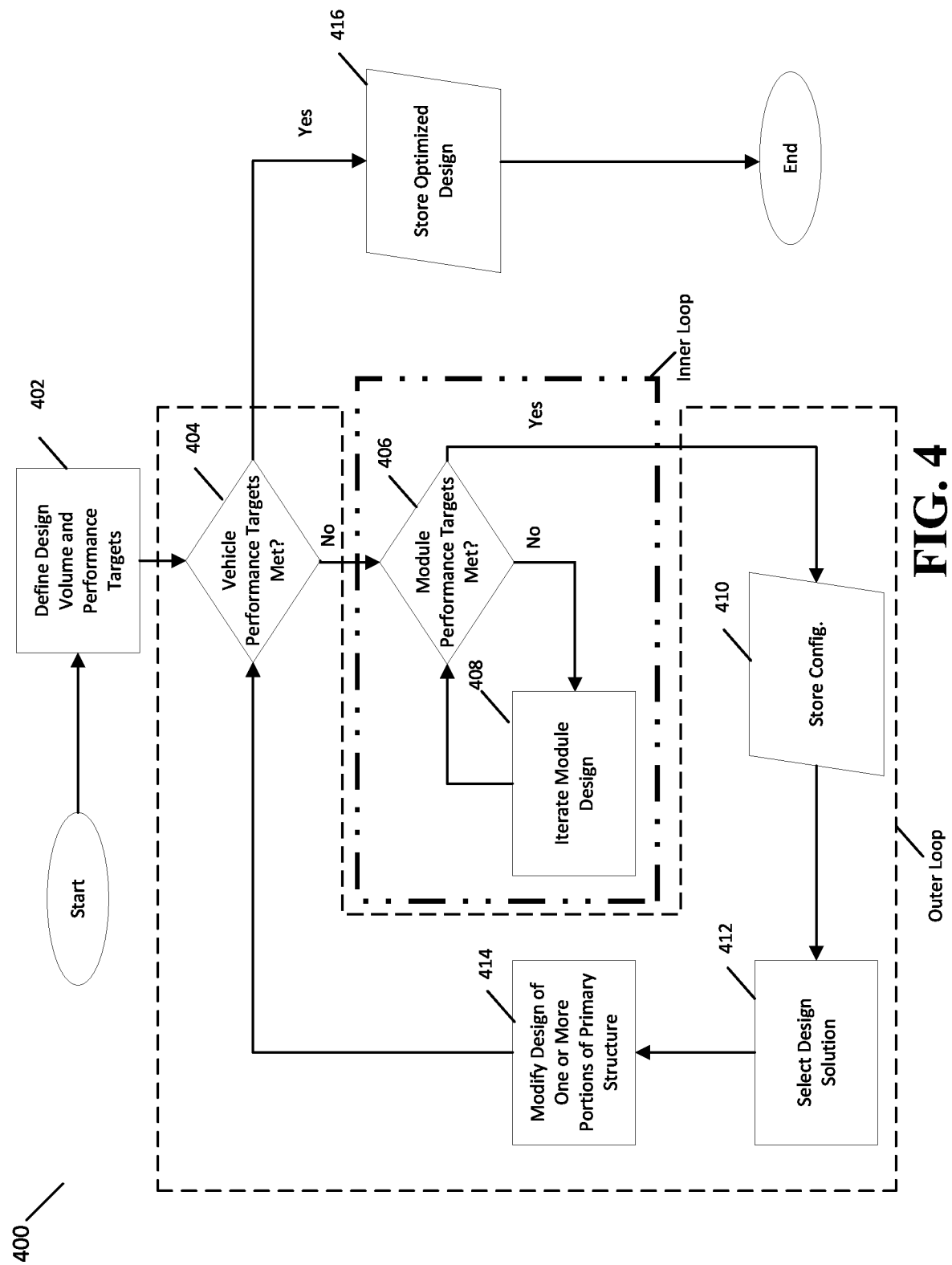

INITIAL DESIGN

INNER LOOP

INNER LOOP

INNER LOOP

FINAL RESULT

ENERGY UNIT CELLS FOR PRIMARY VEHICLE STRUCTURE

CROSS REFERENCE TO RELATED APPLICATION(S)

This application claims the benefit of U.S. Provisional Application Ser. No. 63/139,293, entitled "ENERGY UNIT CELLS FOR PRIMARY VEHICLE STRUCTURE" and filed on Jan. 19, 2021, the disclosure of which is expressly incorporated by reference herein in its entirety.

BACKGROUND

Field

The present disclosure generally relates to energy unit cells, and more particularly, to techniques for optimization of energy unit cells for primary vehicle structure(s).

INTRODUCTION

Three-dimensional (3-D) printing, also referred to as additive manufacturing (AM), presents new opportunities to more efficiently build structures, such as automobiles, aircraft, boats, motorcycles, busses, trains and the like. Applying AM processes to industries that produce these products has proven to produce a structurally more efficient transport structure. For example, an automobile produced using 3-D printed components can be made stronger, lighter, and consequently, more fuel efficient. Moreover, AM enables manufacturers to 3-D print parts that are much more complex and that are equipped with more advanced features and capabilities than parts made via traditional machining and casting techniques.

Despite these recent advances, a number of obstacles remain with respect to the practical implementation of AM techniques in transport structures and other mechanized assemblies. For instance, regardless of whether AM is used to produce various components of such devices, manufacturers typically rely on labor-intensive and expensive techniques such as welding, riveting, etc., to join components together, such as nodes used in a transport structure. The deficiencies associated with welding and similar techniques are equally applicable to components, such as a vehicle gear case, that are currently too large to 3-D print in a single AM step. A given 3-D printer is usually limited to rendering objects having a finite size, often dictated by the available surface area of the 3-D printer's build plate and the allowable volume the printer can accommodate. In these instances, manufacturers are often relegated to building the component using the traditional, expensive and time-consuming machining techniques. Alternatively, manufacturers may 3-D print a number of subcomponents and combine them to form a complete, functional component or assembly.

Furthermore, vehicles (e.g., passenger vehicles, cargo vehicles, surface transport vehicles, aircrafts, space crafts, and the like) include onboard energy storage systems. For certain types of vehicles, onboard energy storage systems can account for significant amount of the vehicle's total mass. For example, for electrical vehicles, onboard energy storage systems can account for almost 40-50% of the electric vehicle's total mass. Additionally, conventional manufacturing techniques cause the onboard energy storage systems to be placed into large energy storage housings which generally do not share any load paths with the rest of the vehicle and also cause redundant extensive support structures to be added to the vehicle to safely hold and/or support the onboard energy storage systems. These energy storage systems do not contribute to stiffness and/or strength of vehicle primary structure, and increase the total mass of the vehicle. The increase in the mass of the vehicle reduces the efficiency and performance of the vehicle and it requires larger energy storage systems to be included in the vehicle for a desired range and/or performance than would be needed if the vehicle was lighter.

Accordingly, the conventional manufacturing techniques exacerbate and do not resolve the efficiency and performance issues of vehicles.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Additive manufacturing (AM) processes involve the use of a stored geometrical model for accumulating layered materials on a "build plate" to produce three-dimensional (3-D) objects having features defined by the model. AM techniques are capable of printing complex components using a wide variety of materials. A 3-D object is fabricated based on a computer aided design (CAD) model. The AM process can create a solid three-dimensional object using the CAD model.

One such method is called Direct Metal Deposition (DMD). DMD is an AM technology that uses a laser to melt metallic powder and thereby transform it into a solid metal object. DMD is not based on a powder bed. Instead, DMD uses a feed nozzle to propel the powder into the laser beam. The powdered metal is then fused by the laser. While supports or a freeform substrate may in some cases be used to maintain the structure being built, almost all the powder in DMD is transformed into solid metal and consequently little waste powder is left to recycle. Using a layer-by-layer strategy, the print head, composed of the laser beam and the feed nozzle, can scan the substrate to deposit successive layers. All kinds of metallic materials can be processed using this technology including, for example, steel, aluminum, nickel alloys, titanium, cobalt, copper, and the like.

Other AM processes, such as powder bed fusion (PBF), may use energy beams (for example, laser) to sinter or melt metallic powder deposited in a powder bed, which then bonds the powder particles together in targeted areas to produce a 3-D structure having the desired geometry. For example, selective laser sintering (SLS) uses a laser to sinter metallic powder as the surface of a powder bed is scanned across. The laser is directed at specific points defined by a CAD model, and the metallic powder is bound together at the specific points to create a solid structure. Similar to SLS, selective laser melting (SLM) uses a high power-density laser to melt and fuse metallic powder. In SLM, however, the metallic powder may be fully melted into a solid 3-D part.

In yet other AM processes, such as binder jetting, a layer of powder may be spread and printheads may strategically deposit a binder into the powder bed. The binder binds the powder in the specific areas that create a layer of the build piece. A printing plate may lower and another layer of powder is spread. Such a process is repeated until the part is completely printed. With powders of certain materials, such as metallic powders, subsequent post-processing steps may be required such as sintering and infiltration. In other AM processes, such as electron beam melting, a powder is placed under a vacuum and a high-powered electron beam is utilized to generate energy needed for high melting capacity and high productivity. The powder is fused together using the energy generated by the electron beam.

The metallic powders used in various AM processes, such as SLS, SLM, binder jetting, and/or electron beam melting may be necessarily within a well-defined size distribution—e.g., 1 micrometers (µm) to 150+µm. For example, for an SLM process, the AM equipment may be configured to use powder between 20 to 63 micrometers. Similarly, AM equipment for PBF process may be configured to use powder between 15 to 45 micrometers, and AM equipment for EBM process may be configured to use powder between 45 to 105 micrometers. In addition, such AM processes may use metallic powders with a specific shape—e.g., substantially spherical metal powder, and/or a specific texture—e.g., substantially smooth powder particles. However, generating powder with such characteristics is difficult, and may result in 50 percent to 70 percent of the powder being wasted.

The present disclosure describes various techniques and solutions for determining and/or optimizing energy unit cells for one or more primary structures of a vehicle. According to the techniques and solutions described herein, a method comprises obtaining enclosure criteria of an enclosure space (e.g., compartments for the placement of energy storage cells in the primary structure), where the enclosure space is configured to contain an energy storage device. The method further includes obtaining a load case of a primary structure of a vehicle. The method further includes determining a primary structure design based on the enclosure criteria and the load case, where the primary structure design incorporates the enclosure space.

In certain aspects, the method includes obtaining energy system criteria of an energy system of the vehicle, the energy system configured to include the energy storage device. In certain aspects, determining the primary structure design is further based on the energy system criteria.

In certain aspects, the method includes determining a connection path configured to connect the energy storage device to the energy system, based on the enclosure space. In certain aspects, determining connection path includes determining a connection path space within the primary structure.

In certain aspects, the connection path space is configured to route one or more wires.

In certain aspects, determining the updated primary structure design includes designating the connection path space as a non-design space.

In certain aspects, the energy system criteria is based on at least vehicle range, vehicle mass, vehicle stiffness, vehicle durability, or vehicle cost. In certain aspects, the method includes determining the energy system criteria.

In certain aspects, the energy system comprises electrical circuit, conductive path, wire path length, wire thickness, wire material, electrical circuit components, or electric motors. In certain aspects, determining the updated primary structure design includes designating the enclosure space as a non-design space. In certain aspects, determining the updated primary structure design includes performing topology optimization based on the load case.

In certain aspects, the method includes determining an opening in the primary structure design, the opening configured to allow access to the energy storage device. In certain aspects, the primary structure design is configured to allow at least a portion of the energy storage device to protrude from the opening. In certain aspects, determining the primary structure design includes determining a hollow portion configured to enclose at least a portion of the energy storage device.

In certain aspects, the enclosure space is arranged fully within the primary structure.

In certain aspects, the enclosure space is based on a shape of the energy storage device. In certain aspects, the shape of the energy storage device includes a prismatic shape.

In certain aspects, determining the enclosure space based on the enclosure criteria. In certain aspects, determining the enclosure space includes selecting the energy storage device from a plurality of different energy storage devices. In certain aspects, the energy storage device includes at least a battery or a fuel tank.

In certain aspects, the enclosure criteria indicates a set of dimensions for the enclosure space, a minimum wall thickness of the enclosure space, energy storage device characteristics, or a minimum size of the enclosure space to enclose the energy storage device.

The foregoing techniques and approaches may be enabled through various apparatuses, systems, methods, and/or computer-readable media described herein.

It will be understood that other aspects of determining and/or optimizing energy unit cells for primary structures will become readily apparent to those skilled in the art from the following detailed description, wherein it is shown and described in several embodiments by way of illustration. As will be realized by those skilled in the art, the disclosed subject matter is capable of other and different embodiments and its several details are capable of modification in various other respects, all without departing from the present disclosure. Accordingly, the drawings and detailed description are to be regarded as illustrative in nature and not as restrictive. To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

Various aspects of apparatuses and methods for joining nodes and subcomponents with adhesive will now be presented in the detailed description by way of example, and not by way of limitation, in the accompanying drawings, wherein:

FIG. 4 illustrates a flowchart of an example method for determining and/or optimizing energy unit cells for primary structures, in accordance with various aspects of the present disclosure;

DETAILED DESCRIPTION

Figure 1:
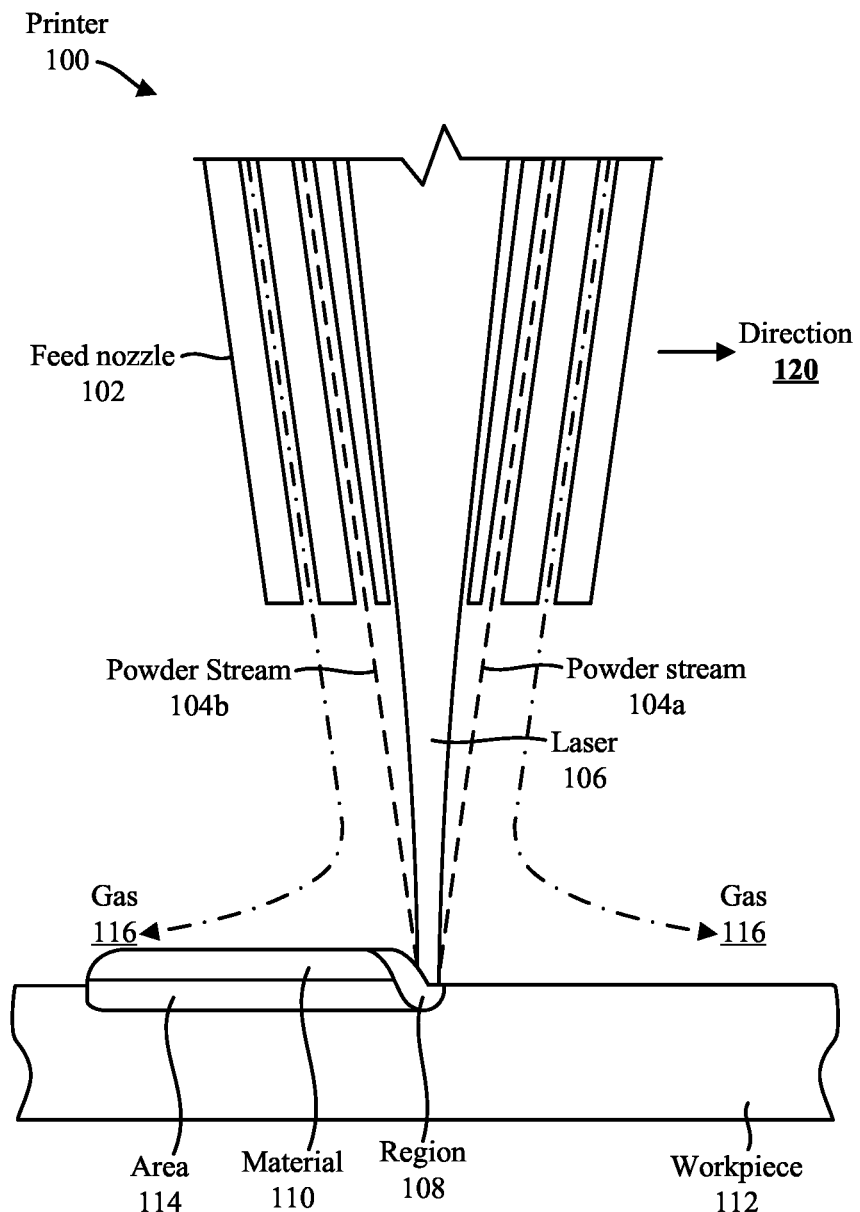
FIG. 1 illustrates an exemplary embodiment of certain aspects of a Direct Metal Deposition (DMD) three-dimensional (3-D) printer.

The detailed description set forth below in connection with the appended drawings is intended to provide a description of various exemplary embodiments and is not intended to represent the only embodiments in which the invention may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure. In addition, the figures may not be drawn to scale and instead may be drawn in a way that attempts to most effectively highlight various features relevant to the subject matter described.

Vehicle construction is generally a tradeoff of function and cost. Energy storage enclosures and structures for other functional elements are generally attached to primary structure (and are essentially parasitic mass with respect to primary structure), and the primary structure of the vehicle is designed to accept safety and operational loads of a vehicle, which may include, but are not limited to, crash loads, structural loads, operational loads, and the like. As describe herein, vehicles may include, but are not limited to, passenger surface transport, cargo surface transport, aircraft, and space craft, and the like. Primary structure of a vehicle generally serves as the backbone to attach all of the vehicle's subsystems to the vehicle, including propulsion (e.g., drivetrain, transmission, electric motors, and the like) and energy storage (e.g., battery, and the like). Since electric vehicles use electric charge to generate motive power, they need to store the electric charge in onboard energy storage systems.

Due to the low gravimetric energy density (e.g., (<230 Wh/kg for energy-type cells) of these energy storage systems, electric vehicles require a significant quantity of energy storage media and/or energy storage cells. As a result, a significant mass of electric vehicles is generally associated with energy storage masses that need to be transported in addition to the payload. However, due to the limitations of the conventional manufacturing techniques, the total mass of the vehicle is further increased.

For example, due to limitations of conventional manufacturing processes and/or techniques, an energy storage enclosure structure (e.g., a battery housing) is required to hold the energy storage cells and furthermore the energy storage enclosure structure is manufactured separately from a primary structure using a discrete and different manufacturing process from the primary structure generally. The discrete and different manufacturing process of the primary structure prevents successful functional integration of an energy storage system into a primary structure of the vehicle. The failure to integrate the energy storage system into primary structure results in large enclosure structures for holding the energy storage systems to be added to the vehicles. These enclosure structures have their own mass and fail to contribute to the stiffness and/or strength of the primary structure of the vehicle. Furthermore, these enclosure structures fail to share any loads of the vehicles and require additional support structures to be added in the vehicle for supporting the enclosure structures. Thus, the total mass of further increases which further reduces the efficiency and performance of the vehicle.

Accordingly, the present disclosure is generally directed to manufacturing techniques that allow for energy unit cells to be functionally integrated into primary structure of a vehicle. The manufacturing techniques disclosed herein allow for energy unit cells of an energy storage system of a vehicle to be subdivided and integrated into one or more locations of a primary structure of the vehicle. Additionally, the present disclosure provides techniques and solutions for determining and/or optimizing location of energy storage cells within a primary structure for a vehicle criteria and/or enclosure criteria.

Additive Manufacturing (3-D Printing). AM is advantageously a non-design specific manufacturing technique. AM provides the ability to create complex structures within a part. For example, nodes can be produced using AM. A node is a structural member that may include one or more interfaces used to connect to spanning components such as tubes, extrusions, panels, other nodes, and the like. Using AM, a node may be constructed to include additional features and functions, depending on the objectives. For example, a node may be printed with one or more ports that enable the node to secure two parts by injecting an adhesive rather than welding multiple parts together, as is traditionally done in manufacturing complex products. Alternatively, some components may be connected using a brazing slurry, a thermoplastic, a thermoset, or another connection feature, any of which can be used interchangeably in place of an adhesive. Thus, while welding techniques may be suitable with respect to certain embodiments, additive manufacturing provides significant flexibility in enabling the use of alternative or additional connection techniques.

A variety of different AM techniques have been used to 3-D print components composed of various types of materials. Numerous available techniques exist, and more are being developed. For example, Directed Energy Deposition (DED) AM systems use directed energy sourced from laser or electron beams to melt metal. These systems utilize both powder and wire feeds. The wire feed systems advantageously have higher deposition rates than other prominent AM techniques. Single Pass Jetting (SPJ) combines two powder spreaders and a single print unit to spread metal powder and to print a structure in a single pass with apparently no wasted motion. As another illustration, electron beam additive manufacturing processes use an electron beam to deposit metal via wire feedstock or sintering on a powder bed in a vacuum chamber. Single Pass Jetting is another exemplary technology claimed by its developers to be much quicker than conventional laser-based systems. Atomic Diffusion Additive Manufacturing (ADAM) is still another recently developed technology in which components are printed, layer-by-layer, using a metal powder in a plastic binder. After printing, plastic binders are removed and the entire part is sintered at once into a desired metal.

One of several such AM techniques, as noted, is DMD. FIG. 1 illustrates an exemplary embodiment of certain aspects of a DMD 3-D printer 100. DMD printer 100 uses feed nozzle 102 moving in a predefined direction 120 to propel powder streams 104a and 104b into a laser beam 106, which is directed toward a workpiece 112 that may be supported by a substrate. Feed nozzle may also include mechanisms for streaming a shield gas 116 to protect the welded area from oxygen, water vapor, or other components.

The powdered metal is then fused by the laser 106 in a melt pool region 108, which may then bond to the workpiece 112 as a region of deposited material 110. The dilution area 114 may include a region of the workpiece where the deposited powder is integrated with the local material of the workpiece. The feed nozzle 102 may be supported by a computer numerical controlled (CNC) robot or a gantry, or other computer-controlled mechanism. The feed nozzle 102 may be moved under computer control multiple times along a predetermined direction of the substrate until an initial layer of the deposited material 110 is formed over a desired area of the workpiece 112. The feed nozzle 102 can then scan the region immediately above the prior layer to deposit successive layers until the desired structure is formed. In general, the feed nozzle 102 may be configured to move with respect to all three axes, and in some instances to rotate on its own axis by a predetermined amount.

Figure 2:
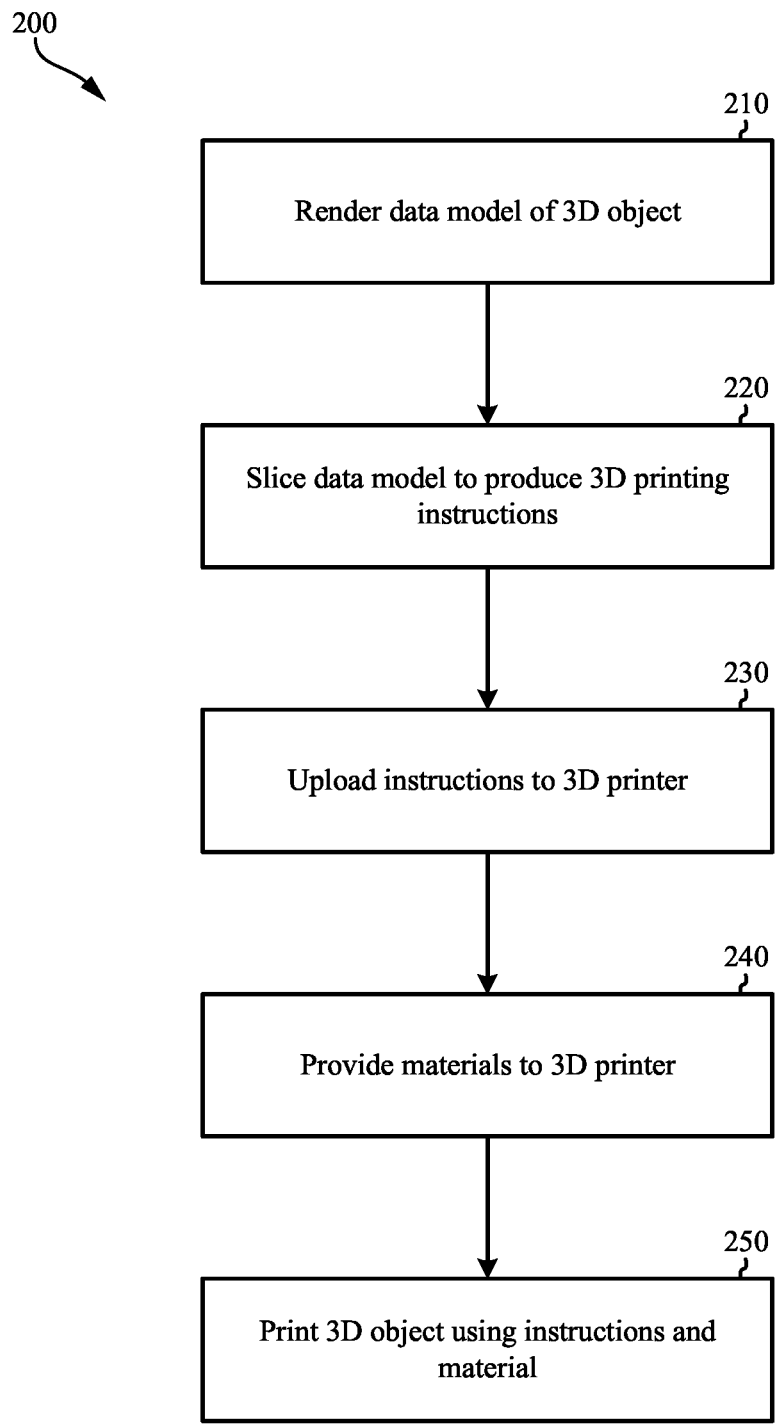
FIG. 2 illustrates a conceptual flow diagram of a 3-D printing process using a 3-D printer.

FIG. 2 is a flow diagram 200 illustrating an exemplary process of 3-D printing. A data model of the desired 3-D object to be printed is rendered (operation 210). A data model is a virtual design of the 3-D object. Thus, the data model may reflect the geometrical and structural features of the 3-D object, as well as its material composition. The data model may be created using a variety of methods, including CAE-based optimization, 3D modeling, photogrammetry software, and camera imaging. CAE-based optimization may include, for example, cloud-based optimization, fatigue analysis, linear or non-linear finite element analysis (FEA), and durability analysis.

3-D modeling software, in turn, may include one of numerous commercially available 3-D modeling software applications. Data models may be rendered using a suitable computer-aided design (CAD) package, for example in an STL format. STL is one example of a file format associated with commercially available stereolithography-based CAD software. A CAD program may be used to create the data model of the 3-D object as an STL file. Thereupon, the STL file may undergo a process whereby errors in the file are identified and resolved.

Following error resolution, the data model can be "sliced" by a software application known as a slicer to thereby produce a set of instructions for 3-D printing the object, with the instructions being compatible and associated with the particular 3-D printing technology to be utilized (operation 220). Numerous slicer programs are commercially available. Generally, the slicer program converts the data model into a series of individual layers representing thin slices (e.g., 100 microns thick) of the object be printed, along with a file containing the printer-specific instructions for 3-D printing these successive individual layers to produce an actual 3-D printed representation of the data model.

The layers associated with 3-D printers and related print instructions need not be planar or identical in thickness. For example, in some embodiments depending on factors like the technical sophistication of the 3-D printing equipment and the specific manufacturing objectives, etc., the layers in a 3-D printed structure may be non-planar and/or may vary in one or more instances with respect to their individual thicknesses.

A common type of file used for slicing data models into layers is a G-code file, which is a numerical control programming language that includes instructions for 3-D printing the object. The G-code file, or other file constituting the instructions, is uploaded to the 3-D printer (operation 230). Because the file containing these instructions is typically configured to be operable with a specific 3-D printing process, it will be appreciated that many formats of the instruction file are possible depending on the 3-D printing technology used.

In addition to the printing instructions that dictate what and how an object is to be rendered, the appropriate physical materials necessary for use by the 3-D printer in rendering the object are loaded into the 3-D printer using any of several conventional and often printer-specific methods (operation 240). In DMD techniques, for example, one or more metal powders may be selected for layering structures with such metals or metal alloys. In SLM, SLS, and other PBF-based AM methods (see below), the materials may be loaded as powders into chambers that feed the powders to a build platform. Depending on the 3-D printer, other techniques for loading printing materials may be used.

The respective data slices of the 3-D object are then printed based on the provided instructions using the material(s) (operation 250). In 3-D printers that use laser sintering, a laser scans a powder bed and melts the powder together where structure is desired, and avoids scanning areas where the sliced data indicates that nothing is to be printed. This process may be repeated thousands of times until the desired structure is formed, after which the printed part is removed from a fabricator. In fused deposition modelling, as described above, parts are printed by applying successive layers of model and support materials to a substrate. In general, any suitable 3-D printing technology may be employed for purposes of this disclosure.

Another AM technique includes PBF. Like DMD, PBF creates "build pieces" layer-by-layer. Each layer or "slice" is formed by depositing a layer of powder and exposing portions of the powder to an energy beam. The energy beam is applied to melt areas of the powder layer that coincide with the cross-section of the build piece in the layer. The melted powder cools and fuses to form a slice of the build piece. The process can be repeated to form the next slice of the build piece, and so on. Each layer is deposited on top of the previous layer. The resulting structure is a build piece assembled slice-by-slice from the ground up.

FIGS. 3A-D illustrate respective side views of an exemplary PBF system 300 during different stages of operation. As noted above, the particular embodiment illustrated in FIGS. 3A-D is one of many suitable examples of a PBF system employing principles of this disclosure. It should also be noted that elements of FIGS. 3A-D and the other figures in this disclosure are not necessarily drawn to scale, but may be drawn larger or smaller for the purpose of better illustration of concepts described herein. PBF system 300 can include a depositor 301 that can deposit each layer of metal powder, an energy beam source 303 that can generate an energy beam, a deflector 305 that can apply the energy beam to fuse the powder, and a build plate 307 that can support one or more build pieces, such as a build piece 309. PBF system 300 can also include a build floor 311 positioned within a powder bed receptacle. The walls of the powder bed receptacle 312 generally define the boundaries of the powder bed receptacle, which is sandwiched between the walls 312 from the side and abuts a portion of the build floor 311 below. Build floor 311 can progressively lower build plate 307 so that depositor 301 can deposit a next layer. The entire mechanism may reside in a chamber 313 that can enclose the other components, thereby protecting the equipment, enabling atmospheric and temperature regulation and mitigating contamination risks. Depositor 301 can include a hopper 315 that contains a powder 317, such as a metal powder, and a leveler 319 that can level the top of each layer of deposited powder.

Figure 3A:
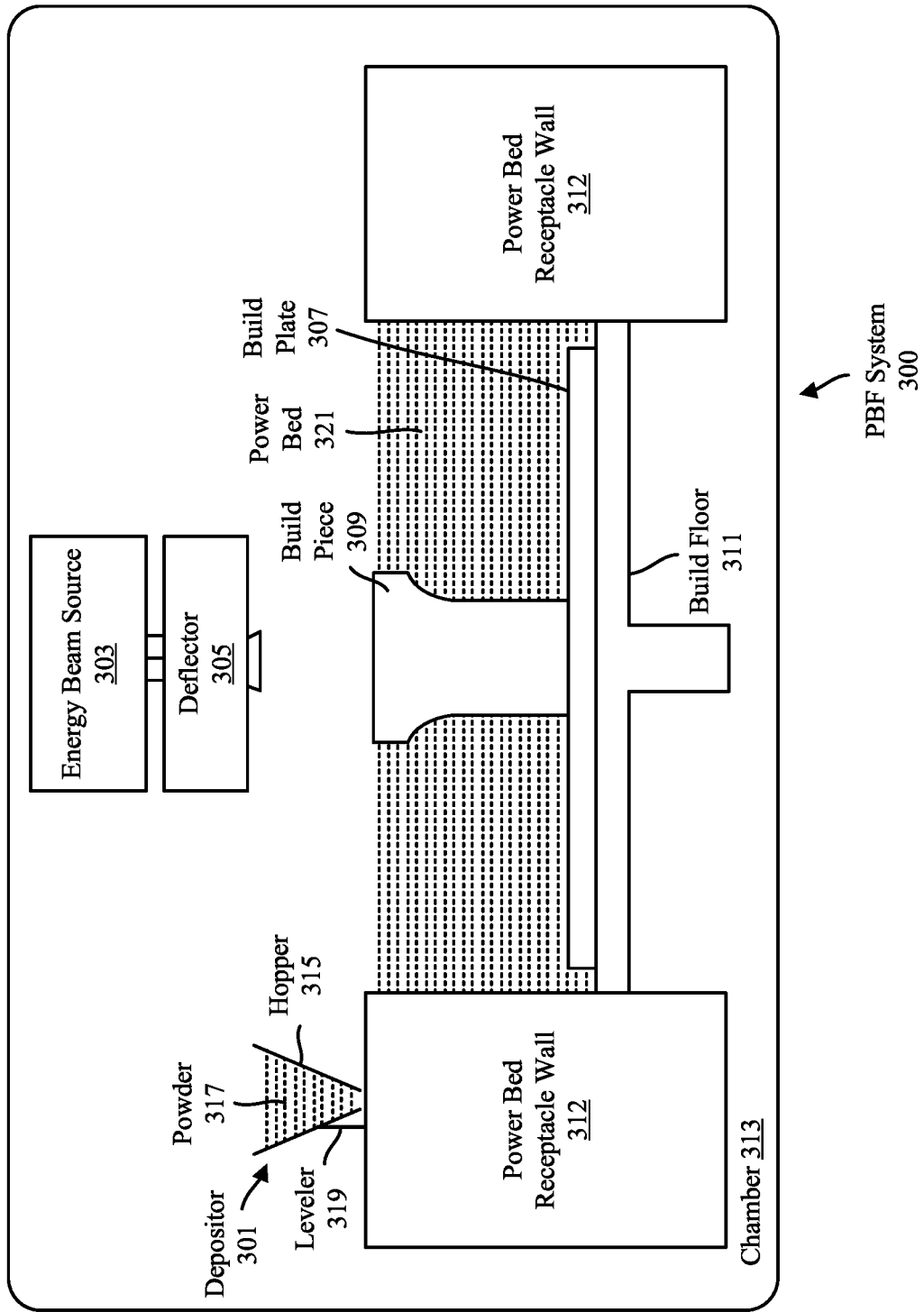
FIGS. 3A-D illustrate exemplary powder bed fusion (PBF) systems during different stages of operation.

Referring specifically to FIG. 3A, this figure shows PBF system 300 after a slice of build piece 309 has been fused, but before the next layer of powder has been deposited. In fact, FIG. 3A illustrates a time at which PBF system 300 has already deposited and fused slices in multiple layers, e.g., 150 layers, to form the current state of build piece 309, e.g., formed of 150 slices. The multiple layers already deposited have created a powder bed 321, which includes powder that was deposited but not fused.

Figure 3B:
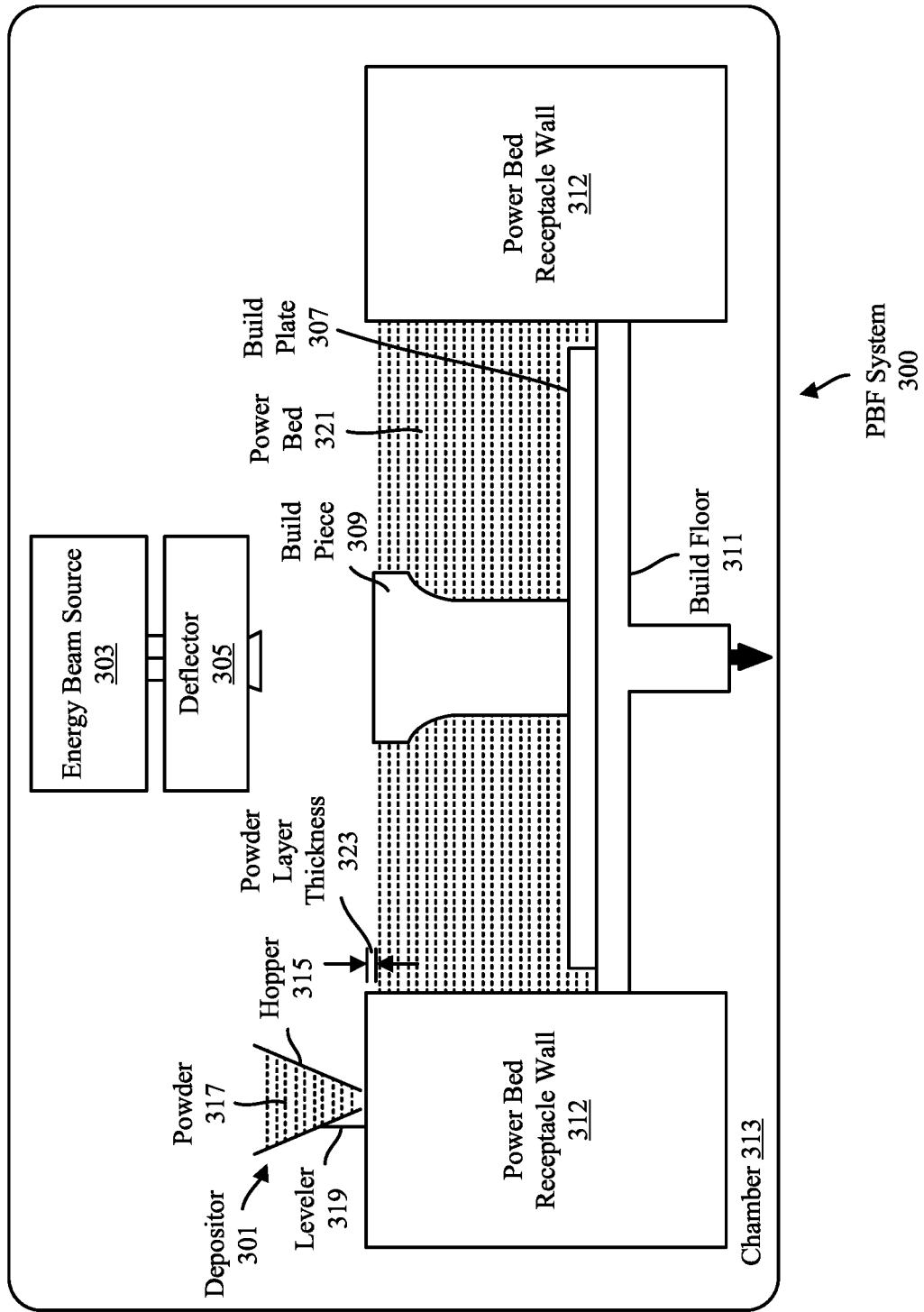

FIG. 3B shows PBF system 300 at a stage in which build floor 311 can lower by a powder layer thickness 323. The lowering of build floor 311 causes build piece 309 and powder bed 321 to drop by powder layer thickness 323, so that the top of the build piece and powder bed are lower than the top of powder bed receptacle wall 312 by an amount equal to the powder layer thickness. In this way, for example, a space with a consistent thickness equal to powder layer thickness 323 can be created over the tops of build piece 309 and powder bed 321.

Figure 3C:
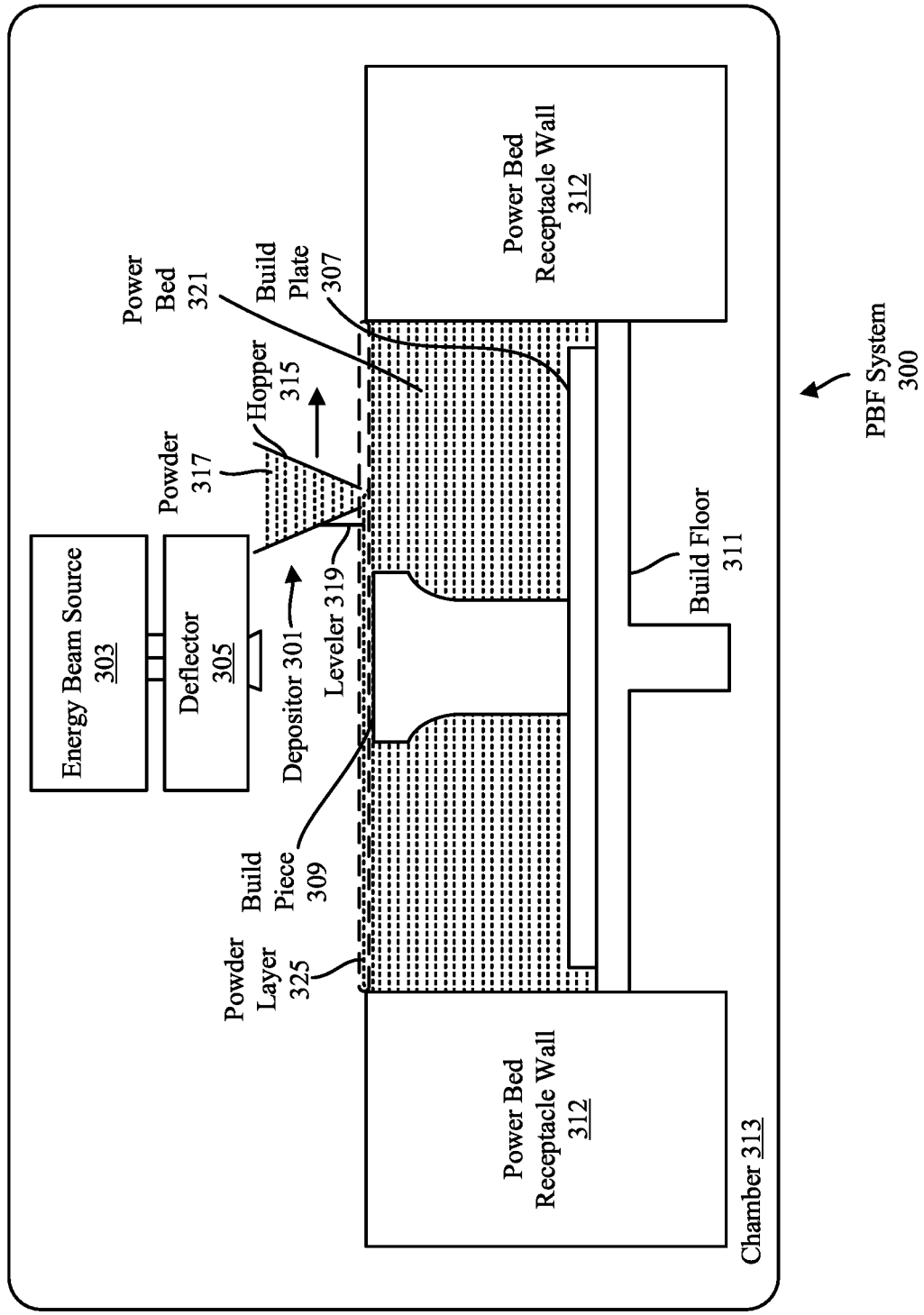

FIG. 3C shows PBF system 300 at a stage in which depositor 301 is positioned to deposit powder 317 in a space created over the top surfaces of build piece 309 and powder bed 321 and bounded by powder bed receptacle walls 312. In this example, depositor 301 progressively moves over the defined space while releasing powder 317 from hopper 315. Leveler 319 can level the released powder to form a powder layer 325 that has a thickness substantially equal to the powder layer thickness 323 (see FIG. 3B). Thus, the powder in a PBF system can be supported by a powder support structure, which can include, for example, a build plate 307, a build floor 311, a build piece 309, walls 312, and the like. It should be noted that the illustrated thickness of powder layer 325 (i.e., powder layer thickness 323 (FIG. 3B)) is greater than an actual thickness used for the example involving 350 previously-deposited layers discussed above with reference to FIG. 3A.

Figure 3D:
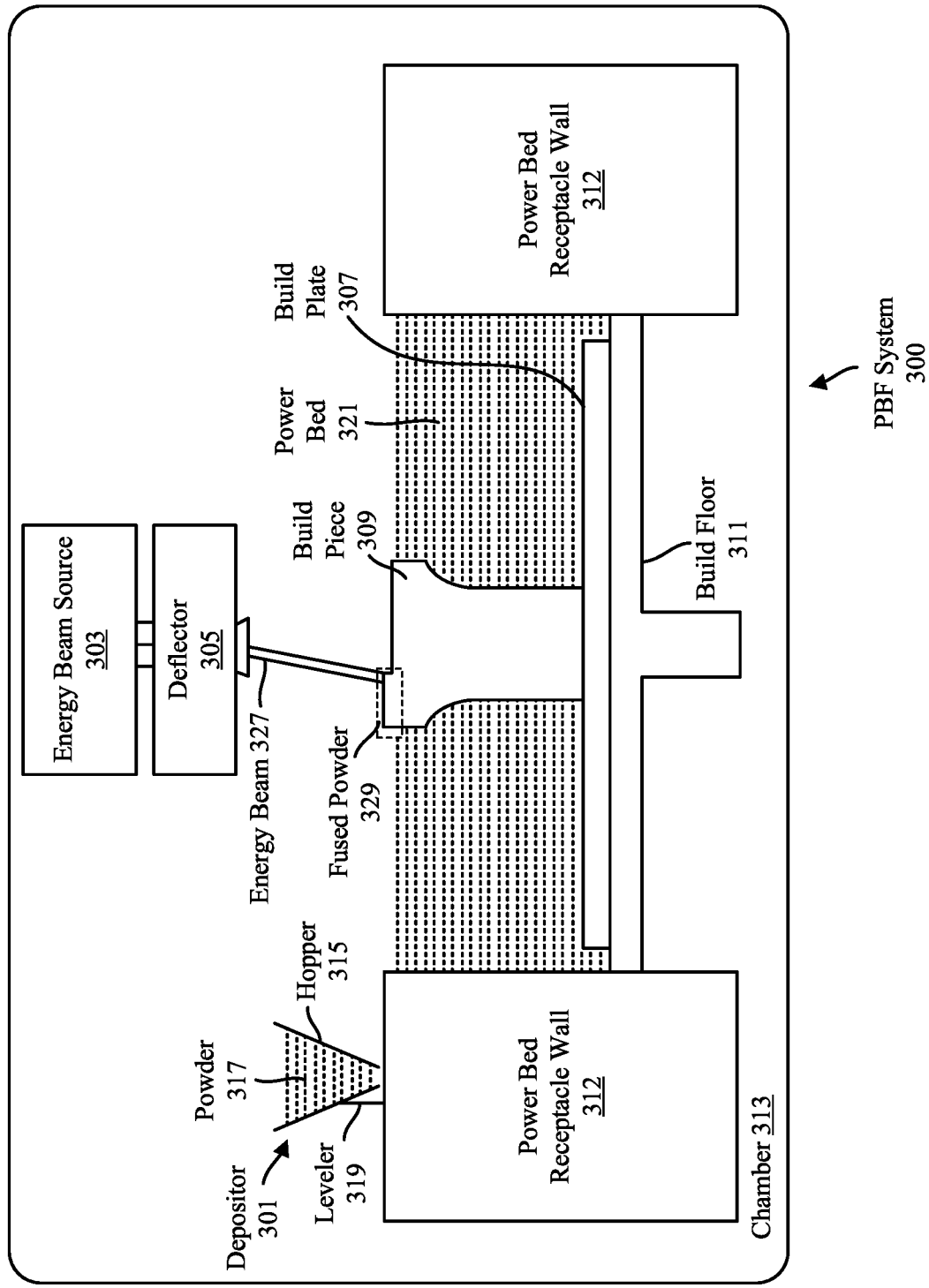

FIG. 3D shows PBF system 300 at a stage in which, following the deposition of powder layer 325 (FIG. 3C), energy beam source 303 generates an energy beam 327 and deflector 305 applies the energy beam to fuse the next slice in build piece 309. In various exemplary embodiments, energy beam source 303 can be an electron beam source, in which case energy beam 327 constitutes an electron beam. Deflector 305 can include deflection plates that can generate an electric field or a magnetic field that selectively deflects the electron beam to cause the electron beam to scan across areas designated to be fused. In various embodiments, energy beam source 303 can be a laser, in which case energy beam 327 is a laser beam. Deflector 305 can include an optical system that uses reflection and/or refraction to manipulate the laser beam to scan selected areas to be fused.

In various embodiments, the deflector 305 can include one or more gimbals and actuators that can rotate and/or translate the energy beam source to position the energy beam. In various embodiments, energy beam source 303 and/or deflector 305 can modulate the energy beam, e.g., turn the energy beam on and off as the deflector scans so that the energy beam is applied only in the appropriate areas of the powder layer. For example, in various embodiments, the energy beam can be modulated by a digital signal processor (DSP).

Figure 3E:
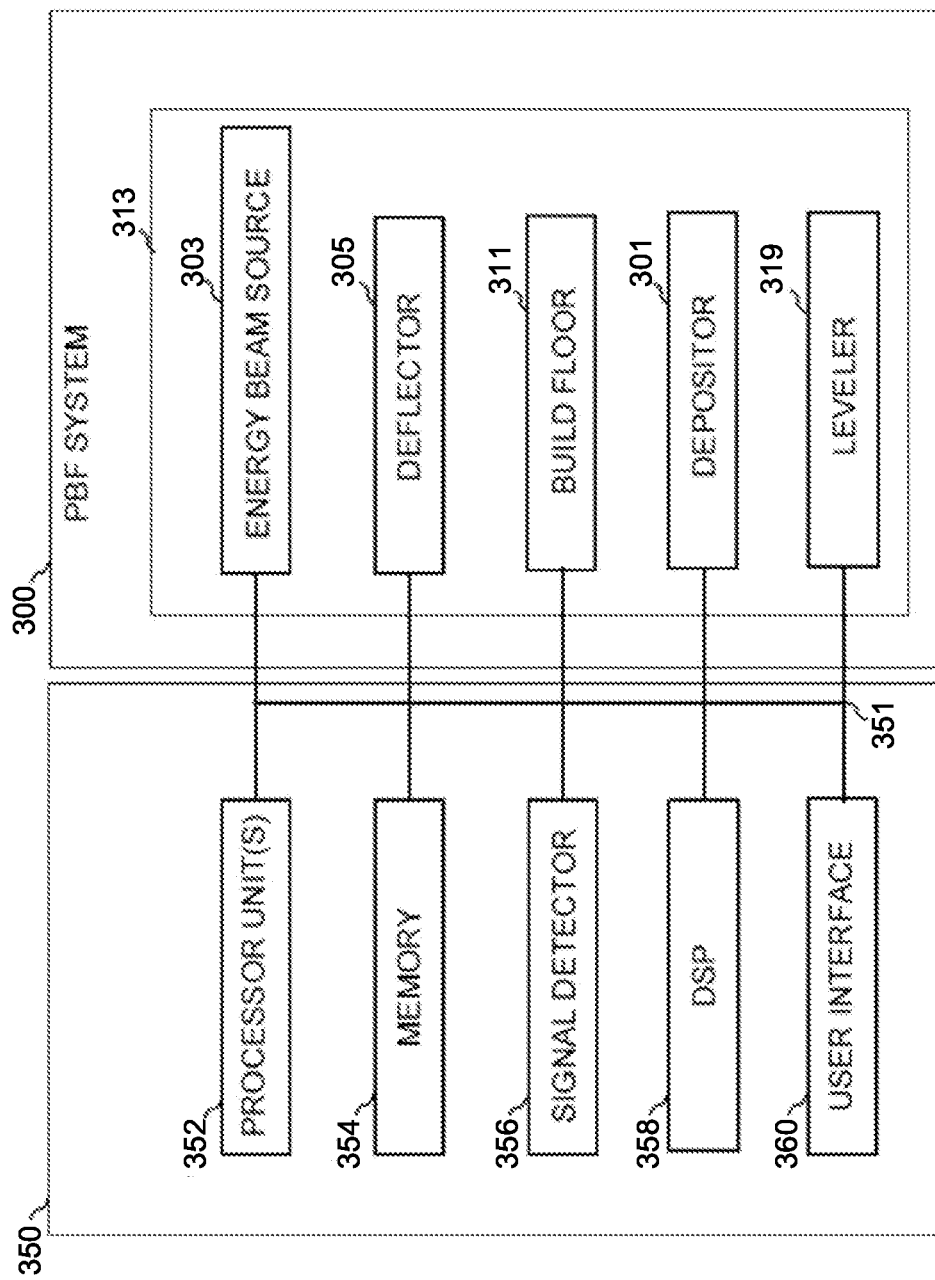
FIG. 3E illustrates a functional block diagram of a 3-D printer system, in accordance with various aspects of the present disclosure.

FIG. 3E illustrates a functional block diagram of a 3-D printer system in accordance with an aspect of the present disclosure. In an aspect of the present disclosure, control devices and/or elements, including computer software, may be coupled to PBF system 300 to control one or more components within PBF system 300. Such a device may be a computer 350, which may include one or more components that may assist in the control of PBF system 300. Computer 350 may communicate with a PBF system 300, and/or other AM systems, via one or more interfaces 351. The computer 350 and/or interface 351 are examples of devices that may be configured to implement the various methods described herein, that may assist in controlling PBF system 300 and/or other AM systems. Although computer 350 is shown in this example connected to a 3D printer, PBF system 300, it should be appreciated that in various aspects, computer 350 may operate independently, e.g., not connected to a 3D printer, to perform any of the methods disclosed herein by executing corresponding computer code. The results may be, for example, a CAD drawing/design, printer instructions, etc., that may be transmitted to a 3D printer for printing, another computer for further processing, etc.

In an aspect of the present disclosure, computer 350 may comprise at least one processor unit 352, memory 354, signal detector 356, a digital signal processor (DSP) 358, and one or more user interfaces 360. Computer 350 may include additional components without departing from the scope of the present disclosure.

The computer 350 may include at least one processor unit 352, which may assist in the control and/or operation of PBF system 300. Additionally, the processor unit 352 may be configured to execute instructions to perform operations for determining and/or optimizing energy unit cells for primary structures as described herein. For example, the processor unit 352 may be configured to execute and perform operations for the techniques, methods, and/or processes described herein with respect to FIGS. 4-6.

The processor unit 352 may also be referred to as a central processing unit (CPU).

Memory 354, which may include both read-only memory (ROM) and random access memory (RAM), may provide instructions and/or data to the processor 504. A portion of the memory 354 may also include non-volatile random access memory (NVRAM). The processor 352 typically performs logical and arithmetic operations based on program instructions stored within the memory 354. The instructions in the memory 354 may be executable (by the processor unit 352, for example) to implement the methods described herein.

The processor unit 352 may comprise or be a component of a processing system implemented with one or more processors. The one or more processors may be implemented with any combination of general-purpose microprocessors, microcontrollers, digital signal processors (DSPs), floating point gate arrays (FPGAs), programmable logic devices (PLDs), controllers, state machines, gated logic, discrete hardware components, dedicated hardware finite state machines, or any other suitable entities that can perform calculations or other manipulations of information.

The processor unit 352 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, RS-274 instructions (G-code), numerical control (NC) programming language, and/or any other suitable format of code). The instructions, when executed by the one or more processors, cause the processing system to perform the various functions described herein.

The computer 350 may also include a signal detector 356 that may be used to detect and quantify any level of signals received by the computer 350 for use by the processing unit 352 and/or other components of the computer 350. The signal detector 356 may detect such signals as energy beam source 303 power, deflector 305 position, build floor 311 height, amount of powder 317 remaining in depositor 301, leveler 319 position, and other signals. The computer 350 may also include a DSP 358 for use in processing signals received by the computer 350. The DSP 358 may be configured to generate instructions and/or packets of instructions for transmission to PBF system 300.

The computer 350 may further comprise a user interface 360 in some aspects. The user interface 360 may comprise a keypad, a pointing device, and/or a display. The user interface 360 may include any element or component that conveys information to a user of the computer 350 and/or receives input from the user.

The various components of the computer 350 may be coupled together by a bus system 351. The bus system 351 may include a data bus, for example, as well as a power bus, a control signal bus, and a status signal bus in addition to the data bus. Components of the computer 350 may be coupled together or accept or provide inputs to each other using some other mechanism.

Although a number of separate components are illustrated in FIG. 3E, one or more of the components may be combined or commonly implemented. For example, the processor unit 352 may be used to implement not only the functionality described above with respect to the processor unit 352, but also to implement the functionality described above with respect to the signal detector 356, the DSP 358, and/or the user interface 360. Further, each of the components illustrated in FIG. 3E may be implemented using a plurality of separate elements.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, compact disc (CD) ROM (CD-ROM) or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, digital versatile disc (DVD), floppy disk and Blu-ray disc where disks usually reproduce data magnetically, while discs reproduce data optically with lasers. Thus, computer readable medium comprises a non-transitory computer readable medium (e.g., tangible media).

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Turning now to FIG. 4, illustrates a method 400 for determining and/or optimizing energy unit cells for a primary structure of a vehicle or for parts of a primary structure of a vehicle. The method 400 may be implemented by a computing system (e.g., computer 350). In some implementations, one or more of the illustrated operations may be transposed, omitted, and/or contemporaneously performed.

Initially, design volume and/or performance targets of a vehicle may be defined by the computing system (operation 402). The computing system may be configured to define design volumes and/or performance targets of a vehicle based on user inputs. In some implementations, a user may provide as an input to the computing system, design and non-design volumes within an initial design of a vehicle and/or an initial design of a primary structure, and/or an initial design of one or more parts of a primary structure. In some implementations, a design volume may be a portion of primary structure that may be modified from an current space and/or structure into a new space, volume, and/or structure. In some implementations, the non-design volume may be portion of a primary structure that cannot be further modified from its current space, volume, and/or structure by the computing system (e.g., computer 350). In some implementations, a user may indicate a type of a vehicle (e.g., passenger vehicle, cargo vehicle, passenger sedan vehicle, passenger sports utility vehicle, surface transport vehicle, aircraft, space craft, and the like).

The computing system may receive and/or obtain performance targets of a vehicle. For example, a user may also provide performance targets as an input to the computing system. Performance targets may include, but are not limited to, range of the vehicle (e.g., 600 miles on a single full charge of the total energy storage of the vehicle), maximum speed of the vehicle, acceleration requirements (e.g., 0-60 miles per hour in 3 seconds or less), and the like. Similarly, the computing system may receive and/or obtain operational and/or safety load cases of a vehicle and/or of the primary structure(s) of the vehicle. For example, a user may also provide operational and/or safety load cases of a vehicle and/or of the primary structure(s) of the vehicle.

As part of defining design volumes and/or performance targets, the computing system may be configured to create and/or determine an initial (e.g., seed) design of the vehicle, which can include an initial primary structure of the vehicle and an initial power system, e.g., a number of energy cells with a given capacity and power output (e.g., as described below with respect to the example embodiment of FIGS. 5A-I). In some implementations, the computing system may be configured to retrieve and select designs from a communicatively coupled data storage device configured to store a set of predetermined designs for vehicle and/or primary structures. The predetermined designs of the vehicles and/or primary structures may be stored in association with a vehicle type, performance requirements, safety and/or operational loads of the vehicle and/or primary structure of the vehicle, and the like.

In some implementations, the set of predetermined designs of a vehicle and/or primary structure(s) may include designs previously created, modified, and/or optimized by the computing system. For example, in response to a previous request to determine and/or optimize energy unit cells for a primary structure, the computing system may be configured to store (e.g., in a communicatively coupled storage device) all of the optimized designs generated by the computing system or the optimized designs generated by the computing system and selected by a user. The computing system may be configured to store such optimized designs in association with one or more performance requirements, energy storage requirements, safety and/or operational load cases, vehicle types, and the like.

The computing system may be configured to determine whether the initially determined and/or received designs of the vehicle and/or primary structure(s) satisfies the structural requirements of the vehicle (operation 404), e.g., requirements of the primary structure such as crash load requirements, operational load requirements, etc. Requirements of the vehicle may include, but are not limited to, vehicle performance requirements, total vehicle mass requirements, vehicle stiffness requirements, vehicle durability requirements, vehicle impact performance, and the like.

Each determined and/or received design of the vehicle and/or primary structure(s) may indicate a value for one or more of the requirements of the vehicle. For example, each determined and/or received initial design of the vehicle may indicate a minimum total mass of a vehicle if the vehicle is constructed using the initial design. The computing system may determine whether the initial design satisfies the total vehicle mass requirement by determining whether the indicated minimum mass of the vehicle satisfies the total vehicle mass requirement.

Similarly, the computing system may determine whether the initial design satisfies performance requirements of a vehicle. For example, the computing system may determine whether a total range of the vehicle, maximum speed of the vehicle, and/or an acceleration of the vehicle indicated by the initial design satisfies corresponding total range, maximum speed, and/or acceleration requirements of the vehicle. Similarly, the computing system may be configured to determine whether other vehicle requirements (e.g., vehicle stiffness requirements, vehicle durability requirements, vehicle impact performance, vehicle electrical performance, positions of energy storage devices in the vehicle, and the like) are satisfied by the initial design.

The computing system may optimize design(s) of one or more aspects of the energy system of the vehicle comprising the energy storage module and/or design of the vehicle (referred to herein as the "inner loop," which in this embodiment includes operations 406 and 408), by modifying the design(s) of the energy storage module(s). In response to determining that the initial design does not satisfy the vehicle requirements, the method 400 proceeds to the operation 406. The computing system may determine whether one or more energy modules of the vehicle satisfy the performance requirements of the energy modules (operation 406). An energy module as described herein may be a set a of energy storage devices (e.g., energy unit cells) within an enclosure space in a primary structure. The energy module may not be defined by a physical structural module and/or structure. For example, a set of energy storage devices within an enclosure space of a primary structure may be considered an energy module. The set of energy storage devices of the energy module may be connected (e.g., series connected, parallel connected, and the like) via conductive paths (e.g., bus bars, and the like) with each other and/or other components of the vehicle.

The computing system may determine whether an energy module satisfies performance requirement by determining whether a number of energy storage devices of the vehicle satisfy a threshold number of energy storage devices (e.g., a maximum number) in an energy module. In some implementations, the computing system may determine the threshold number of energy storage devices in an energy module based on energy system criteria of an energy system of the vehicle. The computing system may determine the energy system criteria of the energy system of the vehicle based on the performance requirements of the vehicle. In some implementations, the threshold number of energy storage devices may be provided by a user.

The computing system may also be configured to determine whether an energy module satisfies performance requirement and/or targets by determining whether the performance of the energy module satisfies other threshold performance requirements. For example, the computing system may determine whether a total thermal exertion or temperature of the energy module exceeds a threshold thermal exertion or temperature of the vehicle, and the computing system may determine that the threshold thermal performance of the energy module is not satisfied when total thermal exertion or temperature of the energy module exceeds the threshold thermal exertion or temperature of the vehicle.

In response to determining that the energy module does not satisfy the performance requirement of the energy module, the method proceeds to operation 408. The computing system may be configured to optimize the one or more energy modules by iterating over various energy module designs (operation 408). The computing system may be configured to optimize the one or more energy modules using one or more optimization methods (e.g., known optimization methods). The computing system may be configured to optimize for performance of energy system of the vehicle, performance of the energy module (e.g., a number of batteries, a connection architecture, etc.), mass of energy system of the vehicle, mass of energy module, cost of the energy system of the vehicle, and/or cost of energy module of the vehicle.

The computing system may optimize energy module by modifying and/or changing a number of energy storage devices in the energy module, layout of energy storage devices in the energy module, total voltage of the energy storage devices, heat transfer characteristics of the energy storage devices, conductive paths (e.g., bus bars, and the like) of the energy module.

For each optimized energy module design, the method may proceed back to operation 406, and the computing system may determine whether the modified, iterated, and/or optimized energy module satisfy the performance requirements (operation 406). In response to determining that the optimized energy module design satisfies the performance requirements, the computing system may store one or more energy module designs and/or any associated configurations in a storage device (operation 410).

The computing system may optimize design(s) of one or more portions of primary structure of the vehicle comprising the energy storage module and/or design of the vehicle (referred to herein as the "outer loop," which in this embodiment includes operations 410, 412, 414, and 404), by modifying the design(s) of the one or more portions of primary structure. In some implementations, the outer loop may be performed first, followed by the inner loop (as shown in the example implementation of FIGS. 5A-I). The computing system may select an optimized energy module from the one or more optimized energy module designs (operation 412). In some implementations, the computing system may provide the one or more optimized energy module designs to a user for selection. For example, the computing system may cause the optimized energy module designs to be displayed to a display screen communicatively coupled to the computing system and/or a remote display screen. The user may select one of the optimized energy module designs and provide the selected design as an input to the computing system. In some implementations, the computing system may be configured to select one of the optimized energy module designs.

The computing system may be configured to modify the design of the one or more portions of primary structure by changing the size, shape, position, material, material density, thickness, and the like, of one or more portions, as well as the size, shape, position, etc., of the energy cell enclosures (i.e., compartments for the placement of energy storage cells in the primary structure) (operation 414). For example, the computing system may iterate the topology of the primary structure, including the energy cell enclosures within the primary structure. For example, the computing system may increase or decrease the size of the one or more portions of the primary structure based on changes, if any, of energy storage module included in the enclosure space of one or more portions. The computing system may be configured to modify the designs of the one or more portions of primary structure of the vehicle while optimizing for one or more requirements of the vehicle as constraints. For example, the computing system may be configured to modify the designs of the one or more portions of primary structure, while optimizing for total mass of the vehicle, stiffness, durability, and the like. In this way, operation 414 can generate an optimized design.

The method 400 may proceed back to operation 404, and the computing system may determine whether the optimized design of the one or more portions of the primary structure and/or each of the one or more optimized designs of vehicle satisfy performance requirements of the vehicle (operation 404). In response to determining that the optimized design satisfies performance requirements of the vehicle, the computing system may store the optimized design in a communicatively coupled storage device (operation 416).

In some implementations, the computing system may provide one or more optimized designs of the one or more portions of the primary structure and/or one or more optimized designs of vehicle to a user for selection. For example, the computing system may cause the optimized designs to be displayed to a display screen communicatively coupled to the computing system and/or a remote display screen. The user may select one of the optimized energy module designs and provide the selected design as an input to the computing system. In some implementations, the computing system may be configured to select one of the one or more optimized designs.

Figure 5A:
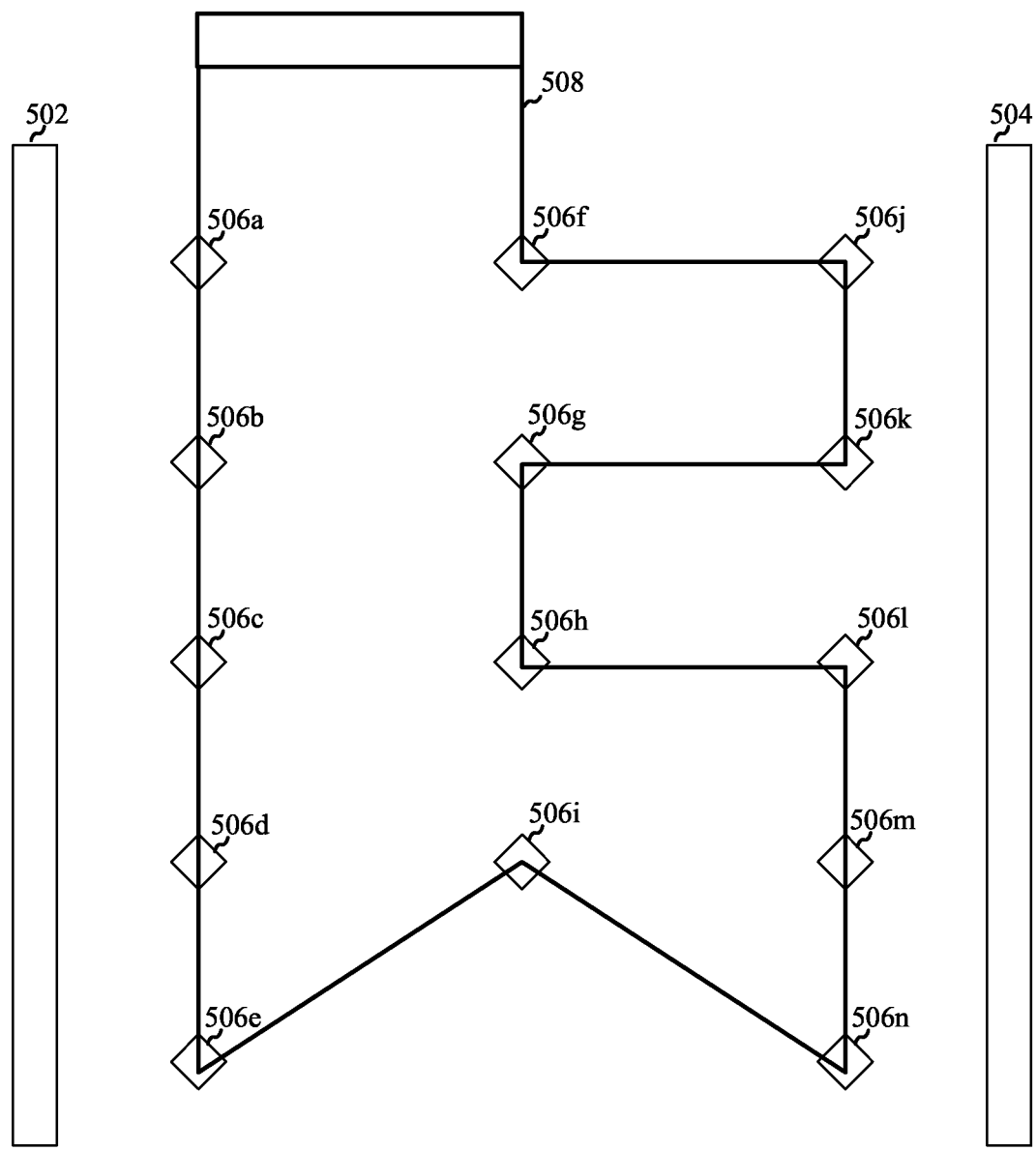
FIGS. 5A-5I illustrate an exemplary process of determining and/or optimizing energy unit cells for primary structures, in accordance with various aspects of the present disclosure.

Turning now to FIGS. 5A-5I, there is illustrated a process for determining and/or optimizing energy unit cells for primary structures, in accordance with various aspects of the present disclosure. In FIG. 5A, there is shown an initial design of a portion of a vehicle. The initial design of a portion of the vehicle illustrated in FIG. 5A, there are shown two initial primary structures, 502, 504 of a vehicle, and a set of energy storage devices (e.g., energy unit cells) 506a-506n, collectively referred to herein as energy storage devices 506. The energy storage devices 506 may be connected via conductive path 508.

Figure 5B:
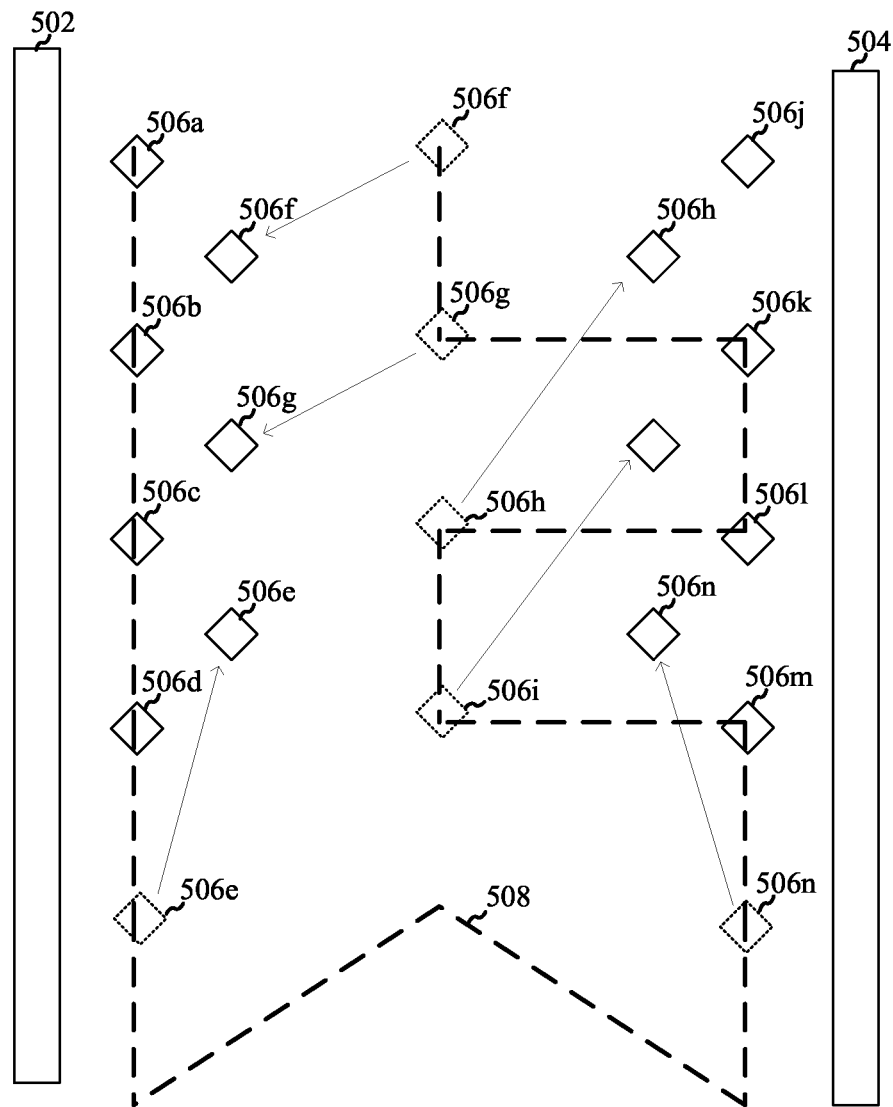

The computing system (e.g., computer 350) may be configured to optimize initial designs illustrated in FIG. 5A based on the operations described above with the respect to FIG. 4, including the inner loop and the outer loop as described above. The computing system may be configured to optimize the initial designs, by modifying the arrangement of the energy storage devices 506, for example, by performing operations in the outer loop described above. For example, the computing system may rearrange one or more energy storage devices 506e, 506f, 506g, 506h, 506i, and 506n as shown in FIG. 5B, with respect to the primary structure. In this example, energy storage devices 506 can be repositioned closer to the initial primary structure in a first step in incorporating the energy device enclosures into the primary structure. In the example of FIG. 5B, the outer loop operation does not reposition conductive path 508, therefore, the conductive path is shown as a dashed line for the purpose of illustration.

Figure 5C:
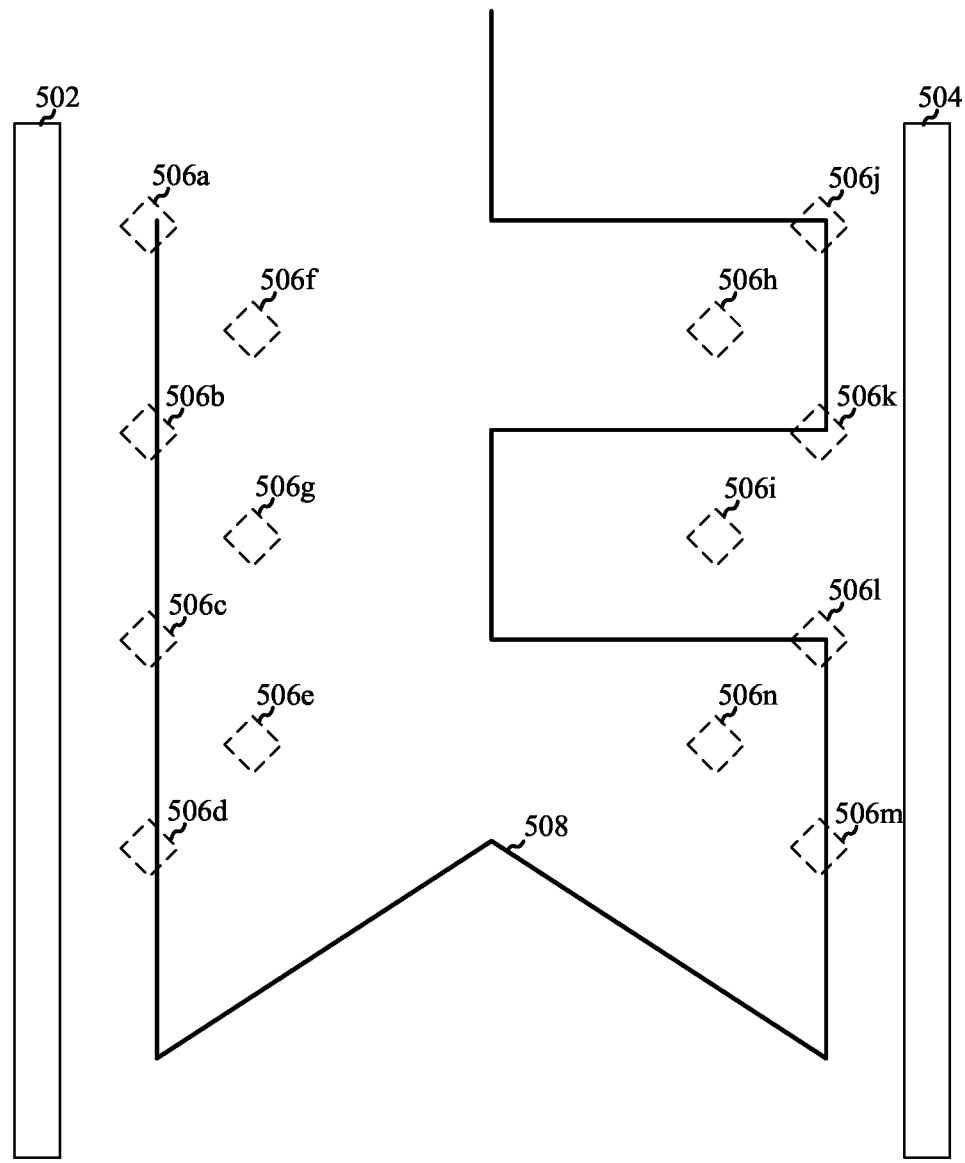
Figure 5D:
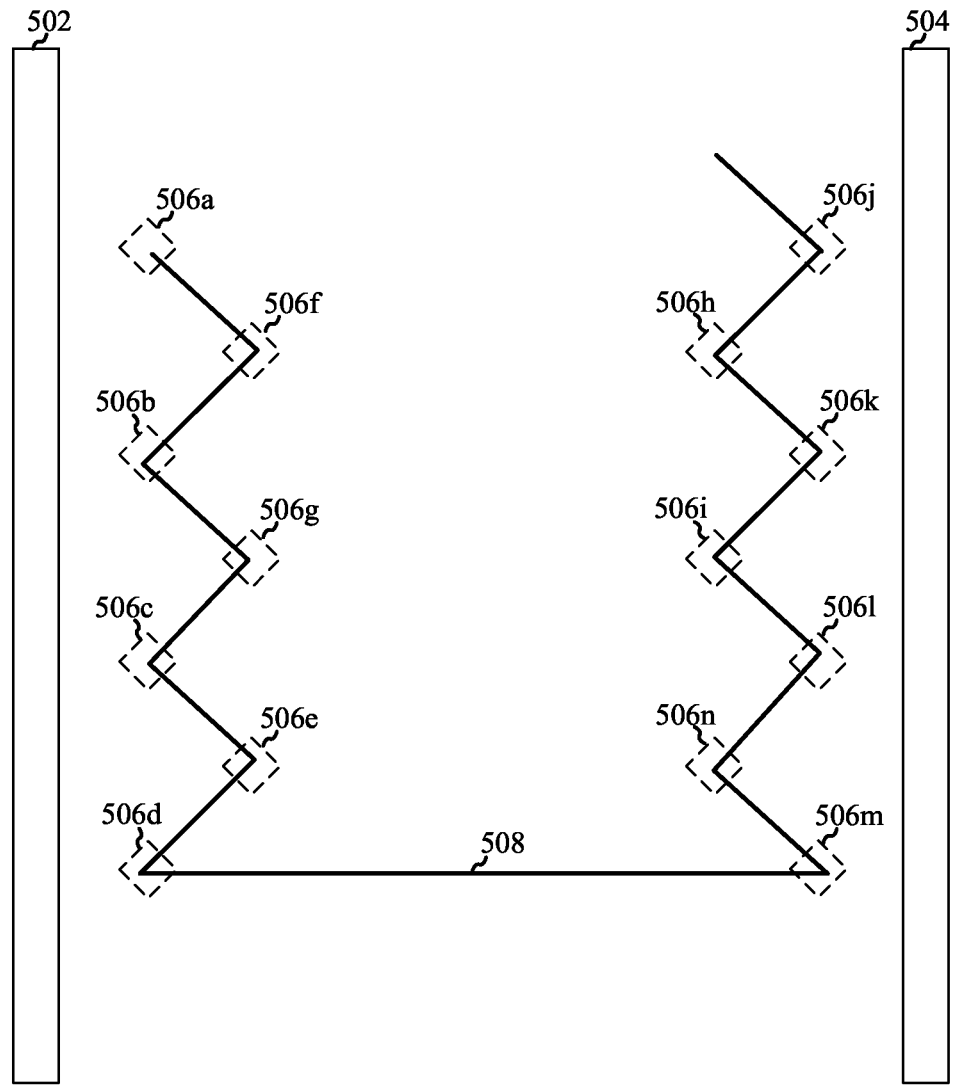
Figure 5E:
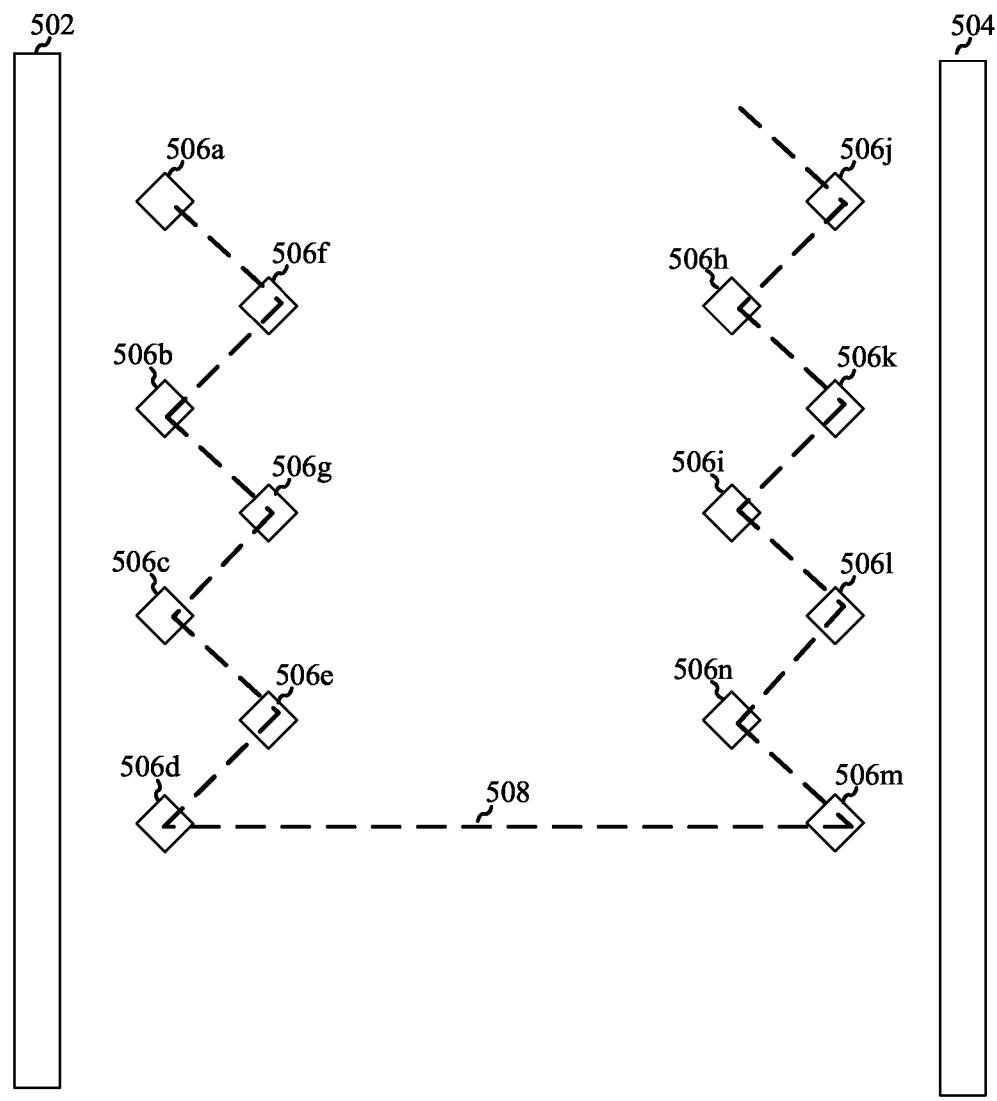

The arrangement of primary structure, energy storage devices, and conductive path shown in FIG. 5B may be transferred to an inner loop operation as shown in FIG. 5C, which shows the same configuration as FIG. 5B, but because the inner loop operate to optimize the energy system, conductive path 508 is shown as a solid line, and energy storage modules 506 are shown as dashed lines. In the inner loop, in response to the modified arrangement of the energy storage devices 506, the computing system may optimize the conductive path 508 for the modified arrangement energy storage devices 506 as shown in FIG. 5D, including determining whether the modified arrangement of energy storage devices 506 and conductive path 508 satisfy the performance requirements of the vehicle. In response to determining that the modified arrangement of energy storage devices 506 satisfies the performance requirements of the vehicle, the computing system may output the arrangement shown in FIG. 5D to the outer loop, which is illustrated in FIG. 5E with conductive path 508 shown as a dashed line.

Figure 5F:
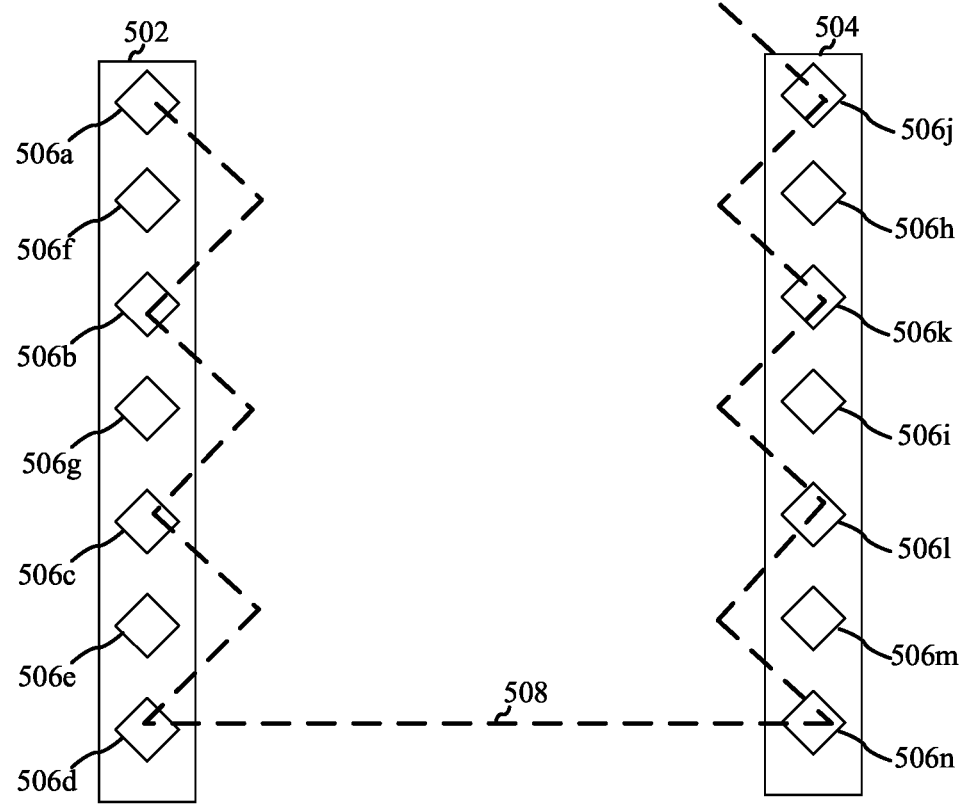

The computing system can further modify the primary structure by modifying the arrangement of energy storage devices 506 as shown in FIG. 5F, in which all of the energy storage devices have now been arranged within primary structure 502 and 504. The computing system may also modify the shape, size, and/or the like of the primary structures 502, 504. For example, as shown in FIG. 5F, the size of the primary structures 502, 504 is increased so that the enclosure spaces within the primary structures is increased for the storage devices 506 to be included into the primary structures 502, 504.

Figure 5G:
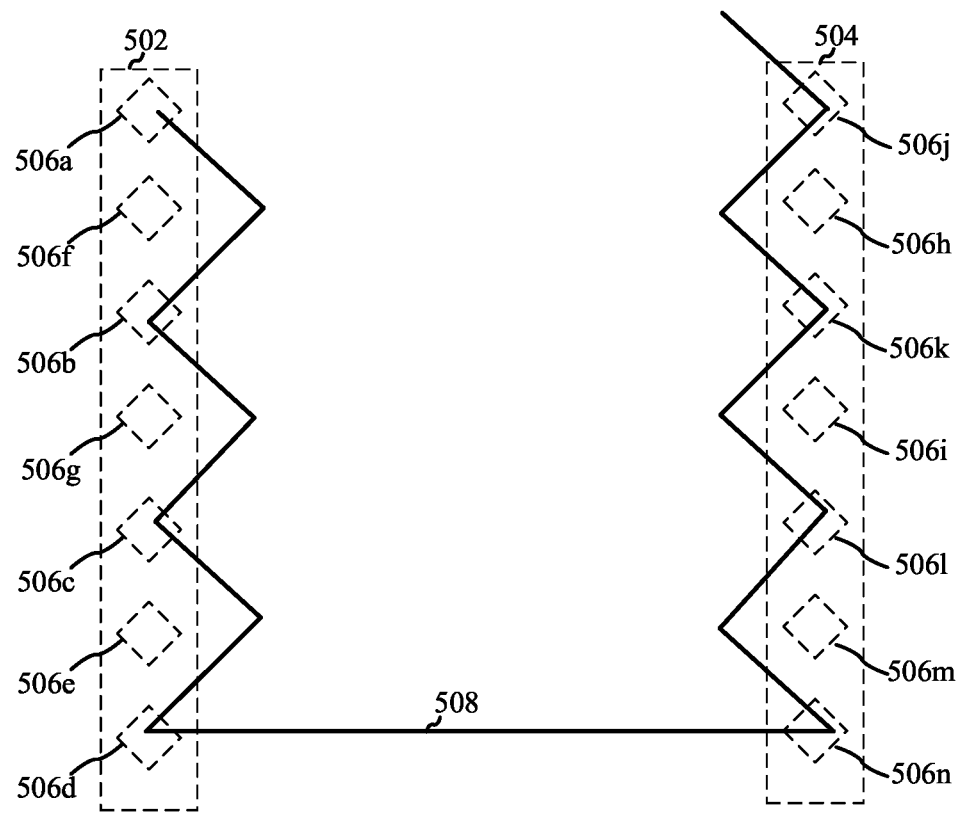

The arrangement shown in FIG. 5F may be output to the inner loop, as shown in FIG. 5G. In FIG. 5G, the computing system may be configured to further modify the conductive path 508 for the modified arrangement of the energy storage devices 506. The further modified conductive path 508 for the modified arrangement of the energy storage devices 506 is shown in FIG. 5H.

Figure 5H:
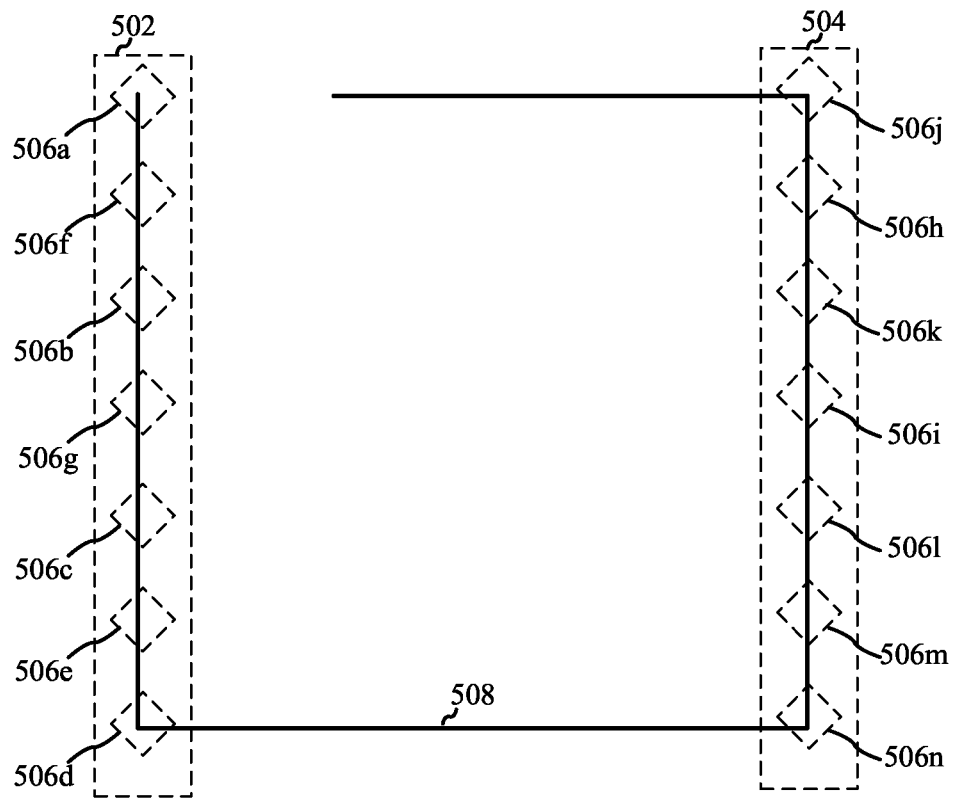
Figure 5I:
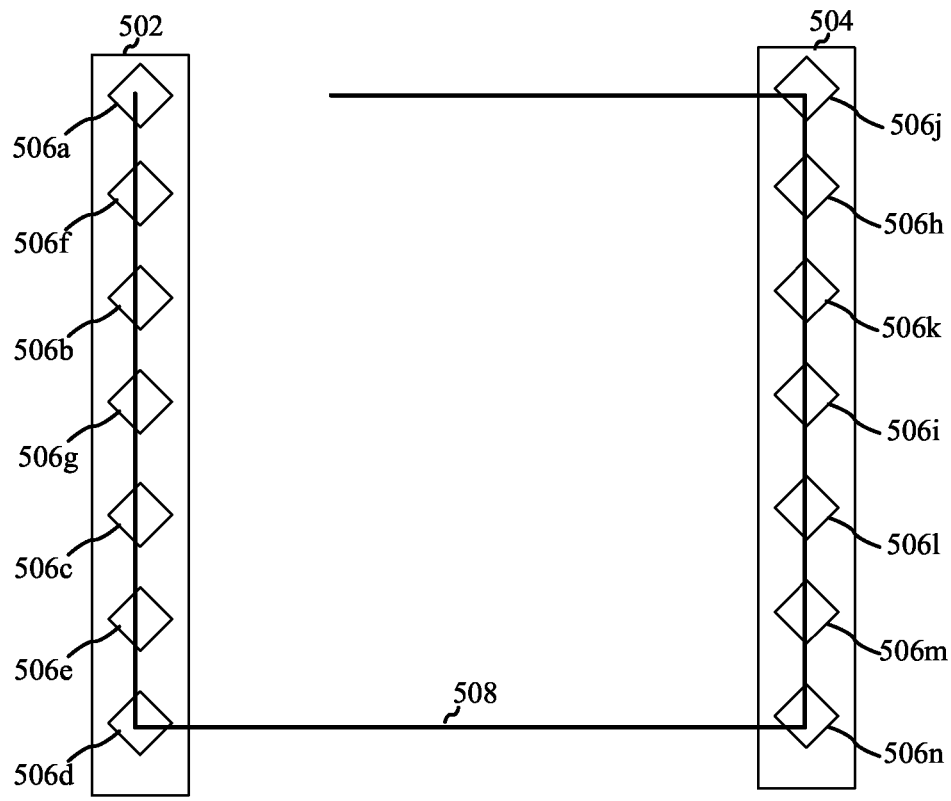

The computing system can determine that the configuration shown in FIG. 5H satisfies the requirements for primary structure and energy system of the vehicle, and FIG. 5I illustrates the final optimized design of the primary structures 502 and 504 and the optimized energy storage devices 506.

Figure 6:
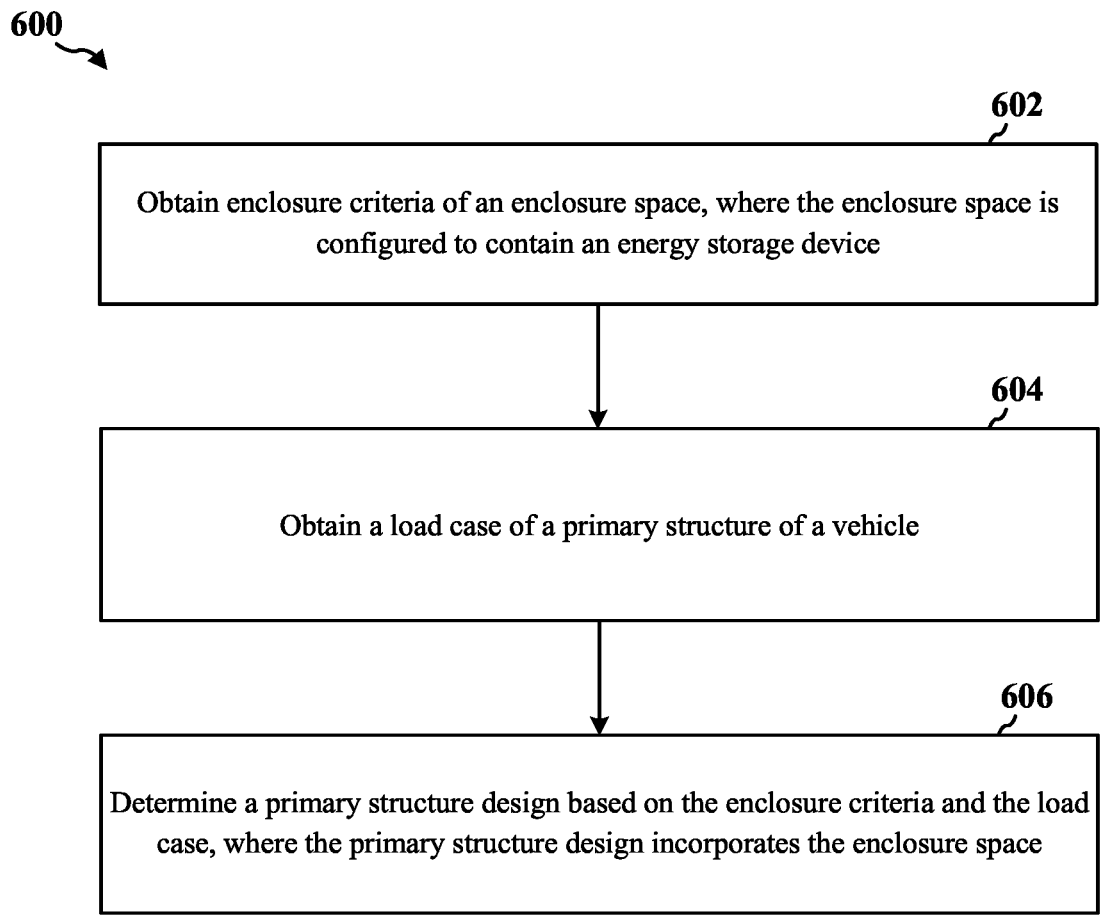
FIG. 6 illustrates a flowchart of an example method for determining and/or optimizing energy unit cells for primary structures, in accordance with various aspects of the present disclosure.

Turning now to FIG. 6, there is shown a method 600 for determining and/or optimizing energy unit cells for primary structures, in accordance with various aspects of the present disclosure. The method 600 may be implemented by a computing system (e.g., computer system 350). According to various embodiments, one or more of the illustrated operations may be transposed, omitted and/or contemporaneously preformed.

Initially, the computing system obtains an enclosure criteria of an enclosure space (operation 602). As described above, the enclosure criteria may be received by the computing system. The enclosure space may be configured to contain an energy storage device. The computing system obtains a load case of a primary structure of a vehicle (operation 604). As described above, the load case of a primary structure of the vehicle may include, but is not limited to, safety and/or operational loads of the primary structure.

The computing system determines a primary structure design based on the enclosure criteria and the load case, where the primary structure design incorporates the enclosure space (operation 606). As described above, in some implementations, the computing system may receive the primary structure design from a user. In some implementations, the computing system may be configured to determine the primary structure design by selecting a primary structure design that includes enclosure space that satisfies the enclosure criteria and can support the obtained load case. For example, the enclosure criteria may indicate a certain volume of space within a primary structure, and the computing system may be configured to select a first set of primary structure designs that satisfy the enclosure space, and then select a primary structure design from the first set of primary structure designs that support the obtained load case.

The computing system may be configured to obtain energy system criteria of an energy system of the vehicle. The energy system of the vehicle may be configured to include the energy storage device. The computing system may determine the primary structure further based on the energy system criteria. For example, the computing system may select the primary structure design that supports the load from the energy system and the selected primary structure also satisfies the enclosure criteria and supports the load case. The energy system criteria may be based on at least vehicle range, vehicle mass, vehicle stiffness, vehicle durability, vehicle cost, and the like. The energy system of the vehicle may include electrical circuit, conducive path, wire path length, wire thickness, wire material, electrical circuit components, electric motors, and the like.

The computing system may be configured to determine a connection path (e.g., conductive path, bus bars, and the like) that is configured to connect the energy storage device to the energy system. The computing system may determine a connection path space within the primary structure as part of determining the connection path configured to connect the energy storage device to the energy system of the vehicle. The computing system may be configured to route one or more wires (e.g., bus bars, conductive paths) through the connection path space.

In some implementations, the computing system may designate the connection path space as a non-design space. In some implementations, the computing system may refrain from modifying the connection path space during the optimization of the designs of the primary structures, and/or designs of one or more portions of the primary structures.

In some implementations, the computing system may designate the enclosure space as non-design space to refrain from modifying the enclosure space during an optimization of the primary structure design. As described above, the computing system may be configured to determine the updated primary structure design by performing topology optimization based on the load case. The computing system may determine an opening in the primary structure design, where the opening is configured to allow access to the energy storage device. In some implementations, the primary structure design is configured to allow at least a portion of the energy storage device to protrude from the opening.

In some implementations, as described above, the computing system may determine the primary structure design by determining a hollow portion configured to enclose at least a portion of the energy storage device. In some implementations, the enclosure space is arranged fully within the primary structure. In some implementations, the enclosure space is further based on a prismatic shape of the energy storage device. In some implementations, the shape of the energy storage device includes a prismatic shape.

In some implementations, the computing system determines the enclosure space by selecting the energy storage device from a plurality of different energy storage devices. In some implementations, the energy storage device includes at least a battery or a fuel tank. In some implementations, the enclosure criteria indicates a set of dimensions for the enclosure space, a minimum wall thickness of the enclosure space, energy storage device characteristics, or a minimum size of the enclosure space to completely enclose the energy storage device.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method comprising:
obtaining enclosure criteria of an enclosure space, wherein the enclosure space is configured to contain an energy storage device;
obtaining a load case of a primary structure of a vehicle; and
determining a primary structure design based on the enclosure criteria and the load case,
wherein the primary structure design incorporates the enclosure space.

2. The method of claim 1, further comprising:
obtaining energy system criteria of an energy system of the vehicle, the energy system configured to include the energy storage device,
wherein determining the primary structure design is further based on the energy system criteria.

3. The method of claim 2, further comprising:
determining, based on the enclosure space, a connection path configured to connect the energy storage device to the energy system.

4. The method of claim 3, wherein determining the connection path includes determining a connection path space within the primary structure.

5. The method of claim 4, wherein the connection path space is configured to route one or more wires.

6. The method of claim 4, wherein determining the primary structure design includes designating the connection path space as a non-design space.

7. The method of claim 2, wherein the energy system criteria is based on at least vehicle range, vehicle mass, vehicle stiffness, vehicle durability, or vehicle cost.

8. The method of claim 2, further comprising:
determining the energy system.

9. The method of claim 8, wherein the energy system comprises electrical circuit, conducive path, wire path length, wire thickness, wire material, electrical circuit components, or electric motors.

10. The method of claim 1, wherein determining the primary structure design includes designating the enclosure space as a non-design space.

11. The method of claim 1, wherein determining the primary structure design includes performing topology optimization based on the load case.

12. The method of claim 11, further comprising:
determining an opening in the primary structure design, the opening configured to allow access to the energy storage device.

13. The method of claim 12, wherein the primary structure design is configured to allow at least a portion of the energy storage device to protrude from the opening.

14. The method of claim 1, wherein determining the primary structure design includes determining a hollow portion configured to enclose at least a portion of the energy storage device.

15. The method of claim 1, wherein the enclosure space is arranged fully within the primary structure.

16. The method of claim 1, wherein the enclosure space is based on a shape of the energy storage device.

17. The method of claim 16, wherein the shape of the energy storage device includes a prismatic shape.

18. The method of claim 1, further comprising:
determining the enclosure space based on the enclosure criteria.

19. The method of claim 18 wherein determining the enclosure space includes selecting the energy storage device from a plurality of different energy storage devices.

20. The method of claim 1, wherein the energy storage device includes at least a battery or a fuel tank.

21. The method of claim 1, wherein the enclosure criteria indicates a set of dimensions for the enclosure space, a minimum wall thickness of the enclosure space, energy storage device characteristics, or a minimum size of the enclosure space to enclose the energy storage device.

* * * * *